(12) United States Patent
Swafford

(10) Patent No.: US 11,379,608 B2
(45) Date of Patent: *Jul. 5, 2022

(54) MONITORING ENTITY BEHAVIOR USING ORGANIZATION SPECIFIC SECURITY POLICIES

(71) Applicant: Forcepoint, LLC, Austin, TX (US)

(72) Inventor: Brandon L. Swafford, Greenwich, CT (US)

(73) Assignee: Forcepoint, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,820

(22) Filed: Dec. 12, 2018

(65) Prior Publication Data

US 2019/0124118 A1    Apr. 25, 2019

Related U.S. Application Data

(63) Continuation of application No. 16/045,284, filed on Jul. 25, 2018.

(Continued)

(51) Int. Cl.
*H04L 29/06* (2006.01)
*G06F 21/62* (2013.01)
(Continued)

(52) U.S. Cl.
CPC ...... *G06F 21/6245* (2013.01); *G06F 11/3438* (2013.01); *G06F 21/552* (2013.01);
(Continued)

(58) Field of Classification Search
CPC .............. H04L 63/20; H04L 29/08819; H04L 63/101–108; H04L 63/1425;
(Continued)

(56) References Cited

U.S. PATENT DOCUMENTS 6,072,875 A    6/2000  Tsudik
6,678,693 B1   1/2004  Shiraishi
(Continued)

FOREIGN PATENT DOCUMENTS

WO    2019153581 A1    8/2019
WO    WO-2019153581 A1 8/2019

OTHER PUBLICATIONS

Naumov et al. Dynamic Framework for Accessing Cyber Security Risks in A Changing Environment, Nov. 4, 2016, IEEE, pp. 1-4. (Year: 2016).*

(Continued)

*Primary Examiner* — Luu T Pham
*Assistant Examiner* — Jenise E Jackson
(74) *Attorney, Agent, or Firm* — Terrile, Cannatti & Chambers; Stephen A. Terrile

(57) ABSTRACT

A system, method, and computer-readable medium are disclosed for enforcing security policies. Enforcing security policies includes monitoring electronically-observable user interactions of an entity, the electronically-observable user interactions comprising corresponding user behavior of the entity; converting the electronically-observable user interactions into electronic information representing the user behavior; and, applying an organization specific security policy based upon the electronic information representing the user behavior, the organization specific security policy comprising an automatically generated organization specific rule.

17 Claims, 13 Drawing Sheets

Related U.S. Application Data

(60) Provisional application No. 62/537,102, filed on Jul. 26, 2017.

(51) Int. Cl.

| | | |
|---|---|---|
| *G06F 21/55* | (2013.01) | |
| *H04L 67/025* | (2022.01) | |
| *G06F 21/57* | (2013.01) | |
| *H04L 67/50* | (2022.01) | |
| *H04L 9/40* | (2022.01) | |
| *H04L 67/141* | (2022.01) | |
| *H04L 67/146* | (2022.01) | |
| *H04L 67/306* | (2022.01) | |
| *G06F 11/34* | (2006.01) | |
| *G06F 21/60* | (2013.01) | |
| *G06F 21/84* | (2013.01) | |
| *H04L 67/289* | (2022.01) | |

(52) U.S. Cl.
CPC .......... *G06F 21/577* (2013.01); *G06F 21/602* (2013.01); *G06F 21/6254* (2013.01); *G06F 21/84* (2013.01); *H04L 63/1408* (2013.01); *H04L 63/1425* (2013.01); *H04L 63/1433* (2013.01); *H04L 63/1441* (2013.01); *H04L 67/025* (2013.01); *H04L 67/141* (2013.01); *H04L 67/146* (2013.01); *H04L 67/22* (2013.01); *H04L 67/306* (2013.01); *G06F 2221/031* (2013.01); *G06F 2221/032* (2013.01); *G06F 2221/034* (2013.01); *H04L 63/20* (2013.01); *H04L 67/289* (2013.01); *H04L 2209/16* (2013.01)

(58) Field of Classification Search
CPC ............. H04L 63/1433; H04L 63/1441; G06F 2201/86; G06F 21/316; G06F 21/552; G06F 21/577; G06F 21/602; G06F 21/6254; G06F 21/84
USPC .......................................................... 726/1
See application file for complete search history.

(56) References Cited

U.S. PATENT DOCUMENTS

| | | |
|---|---|---|
| 7,107,447 B2 | 9/2006 | Sanin et al. |
| 7,694,150 B1 | 4/2010 | Kirby |
| 7,725,565 B2 | 5/2010 | Li et al. |
| 7,813,944 B1 | 10/2010 | Luk et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1* | 7/2013 | Harsell ................ G06F 21/554 726/12 |
| 8,713,633 B2 | 4/2014 | Thomas |
| 8,776,168 B1* | 7/2014 | Gibson ................ H04L 63/102 726/1 |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1* | 5/2015 | Allen ................ H04L 63/1441 726/22 |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1* | 1/2016 | Gibson ................ H04L 63/20 |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,769,908 B1 | 9/2020 | Burris et al. |
| 10,917,319 B2 | 2/2021 | Scheib et al. |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1* | 7/2008 | Hutson ................ G06F 21/552 718/103 |
| 2008/0198453 A1* | 8/2008 | LaFontaine .......... G02B 5/3075 359/485.01 |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1* | 12/2009 | Kaufmann ............ G06F 21/335 726/1 |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |

(56) References Cited

U.S. PATENT DOCUMENTS

| | | |
|---|---|---|
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1* | 3/2012 | Williams ............ H04L 63/1433 709/224 |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1* | 2/2013 | Kshirsagar ............. G06F 21/32 726/6 |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1 | 12/2015 | Eden et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0105334 A1 | 4/2016 | Boe et al. |
| 2016/0117937 A1 | 4/2016 | Penders et al. |
| 2016/0147380 A1 | 5/2016 | Coates et al. |
| 2016/0164922 A1* | 6/2016 | Boss ..................... G06Q 50/01 726/1 |
| 2016/0224803 A1 | 8/2016 | Frank et al. |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1* | 9/2016 | Dwyier ............... H04L 63/1416 |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1* | 11/2016 | Mehrabanzad ......... H04L 67/10 |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0171609 A1 | 6/2017 | Koh |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0276541 A1 | 9/2018 | Studnitzer et al. |
| 2018/0285363 A1 | 10/2018 | Dennis et al. |
| 2018/0288063 A1* | 10/2018 | Koottayi ............... G06F 21/552 |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0014153 A1* | 1/2019 | Lang ..................... G06F 21/604 |
| 2019/0034625 A1 | 1/2019 | Ford et al. |
| 2019/0034813 A1 | 1/2019 | Das et al. |
| 2019/0036969 A1 | 1/2019 | Swafford et al. |
| 2019/0052660 A1 | 2/2019 | Cassidy et al. |
| 2019/0095478 A1 | 3/2019 | Tankersley et al. |
| 2019/0158503 A1 | 5/2019 | Bansal et al. |
| 2019/0174319 A1 | 6/2019 | Backholm et al. |
| 2019/0222603 A1 | 7/2019 | Yang |
| 2019/0289021 A1 | 9/2019 | Ford |
| 2019/0294482 A1 | 9/2019 | Li et al. |
| 2019/0311105 A1 | 10/2019 | Beiter et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | DeLuca et al. |
| 2020/0034462 A1 | 1/2020 | Narayanaswamy et al. |
| 2020/0036740 A1 | 1/2020 | Ford |
| 2020/0065728 A1 | 2/2020 | Wilson et al. |
| 2020/0077265 A1 | 3/2020 | Singh et al. |
| 2020/0089692 A1 | 3/2020 | Tripathi et al. |
| 2020/0117546 A1 | 4/2020 | Wong et al. |
| 2020/0334025 A1 | 10/2020 | Wang et al. |

OTHER PUBLICATIONS

Fathy et al, Security Access Control Research Trends, Apr. 25, 2013, IEEE, pp. 1-6. (Year: 2013).*

(56) References Cited

OTHER PUBLICATIONS

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, p. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Mesaros et al., Latent Semantic Analysis in Sound Event Detection, 19th European Signal Processing Conference (EUSIPCO 2011) pp. 1307-1311.

Marinescu, Dan C., Cloud Computing and Computer Clouds, University of Central Florida, 2012, pp. 1-246.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computerand Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

Singh et al., Container-Based Microservice Architecture for Cloud Applications, International Conference on Computing, Communication and Automation (ICCCA2017), 2017.

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).

Barrere et al., Vulnerability Assessment in Autonomic Networks and Services: A Survey, IEEE, Aug. 30, 2013, vol. 16, issue. 2, pp. 988-1004.

Burns et al., Automatic Management of Network Security Policy, IEEE, Jun. 14, 2001, pp. 12-26.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf, on Management of Data, pp. 993-1008 (May 2017).

* cited by examiner

US 11,379,608 B2

MONITORING ENTITY BEHAVIOR USING ORGANIZATION SPECIFIC SECURITY POLICIES

BACKGROUND OF THE INVENTION

Field of the Invention

The present invention relates in general to the field of computers and similar technologies, and in particular to software utilized in this field. Still more particularly, it relates to a method, system and computer-usable medium for using organization-specific security policies to adaptively respond to entity user behavior.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

However, not all user behaviors pose the same risk. For example, a user accessing an organization's proprietary resources poses a higher risk than the same user perusing an online website during working hours. Consequently, indiscriminately applying the same policy to all user behavior instead of adjusting security oversight accordingly may result in inefficient utilization of security system resources. However, identifying what may be anomalous, abnormal, unexpected, or malicious user behavior can often prove challenging, as such behavior may not be readily apparent when employing typical security monitoring approaches.

SUMMARY OF THE INVENTION

A method, system and computer-usable medium are disclosed for using entity-specific security policies to adaptively respond to entity user behavior.

In one embodiment the invention relates to a computer-implementable method for enforcing security policies, comprising: monitoring electronically-observable user interactions of an entity, the electronically-observable user interactions comprising corresponding user behavior of the entity; converting the electronically-observable user interactions into electronic information representing the user behavior; and, applying an organization specific security policy based upon the electronic information representing the user behavior, the organization specific security policy comprising an automatically generated organization specific rule.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring electronically-observable user interactions of an entity, the electronically-observable user interactions comprising corresponding user behavior of the entity; converting the electronically-observable user interactions into electronic information representing the user behavior; and, applying an organization specific security policy based upon the electronic information representing the user behavior, the organization specific security policy comprising an automatically generated organization specific rule.

In another embodiment the invention relates to a non-transitory, computer-readable storage medium embodying computer program code, the computer program code comprising computer executable instructions configured for: monitoring electronically-observable user interactions of an entity, the electronically-observable user interactions comprising corresponding user behavior of the entity; converting the electronically-observable user interactions into electronic information representing the user behavior; and, applying an organization specific security policy based upon the electronic information representing the user behavior, the organization specific security policy comprising an automatically generated organization specific rule.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
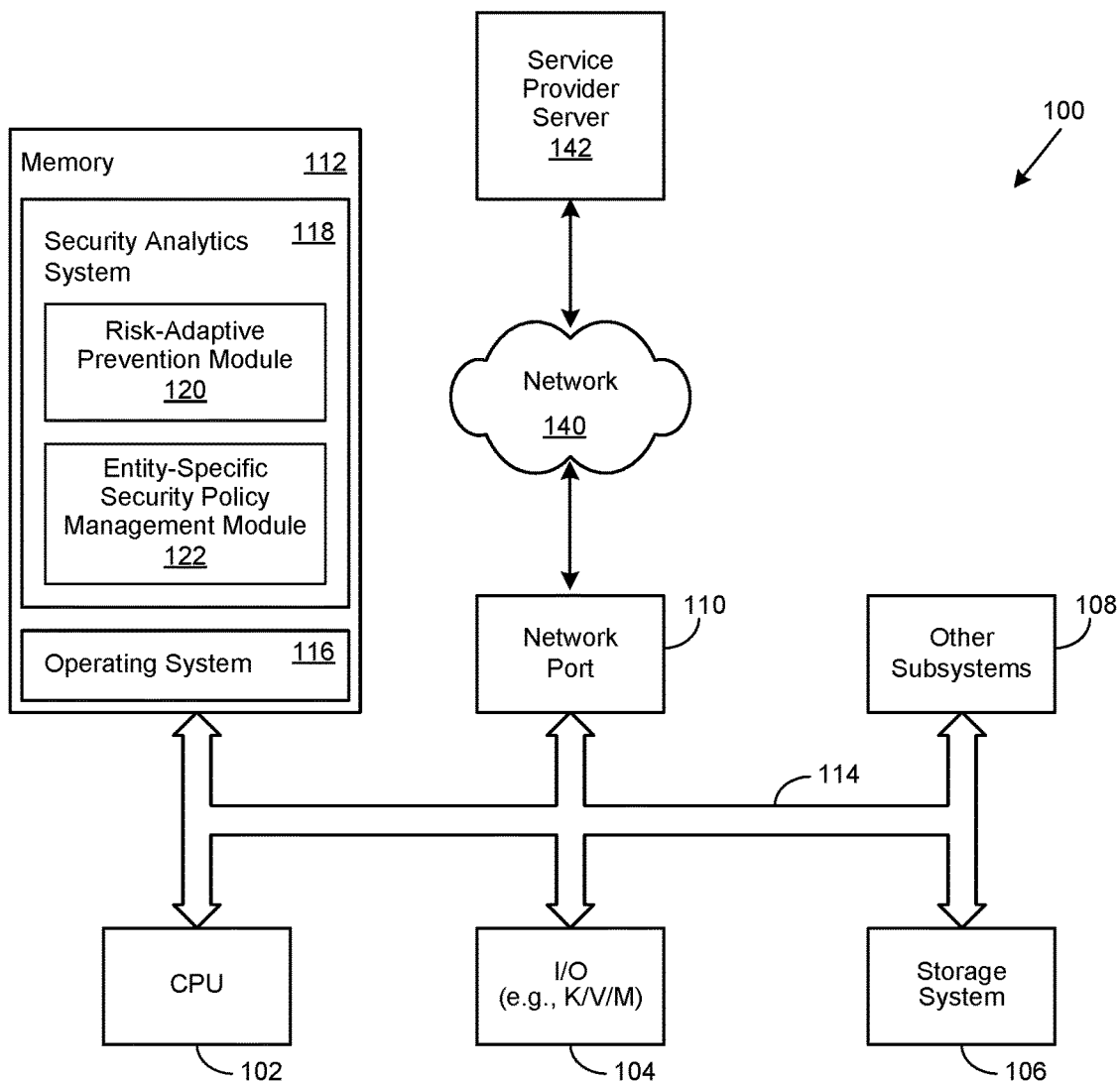
FIG. 1 depicts an exemplary client computer in which the present invention may be implemented.

A method, system and computer-usable medium are disclosed for using entity-specific security policies to adaptively respond to entity user behavior.

Certain aspects of the invention reflect an appreciation that a user's security policy may contain one or more rules preventing the enactment of a particular event. Certain aspects of the invention likewise reflect an appreciation that a security policy may be inadvertently violated as a consequence of the occurrence of a legitimate event or user behavior. Likewise, certain aspects of the invention reflect an appreciation that such violations are often the result of certain security policy rules that have not been updated to reflect changes in a user's role, responsibilities or privileges.

Certain aspects of the invention likewise reflect an appreciation that enforcement of such rules may result in a false positive. As an example, the user may have changed roles since the rule was incorporated into their entity-specific security policy, and as a result, an event that may not have been previously allowed is now permissible. Likewise, certain aspects of the invention reflect an appreciation that manual processes related to keeping the rules of a user's associated security policy up to date can be tedious, time consuming, and error-prone. Furthermore, the use of such manual processes may introduce inefficiencies and frustration into day-to-day activities of the user.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to identify anomalous, abnormal, unexpected, or malicious user behavior. In certain embodiments, the security analytics system 118 may include a risk adaptive prevention module 120 and an entity-specific security policy management module 122. In certain embodiments, the entity-specific security policy management module 122 may be implemented to adaptively evolve an entity-specific security policy associated with an entity according to the enactment of certain electronically-observed user behavior corresponding to an event. In certain embodiments, entity-specific security policy management module 122 may be implemented to use an entity-specific security policy to adaptively respond to electronically-observed user behavior of an associated entity.

Figure 2:
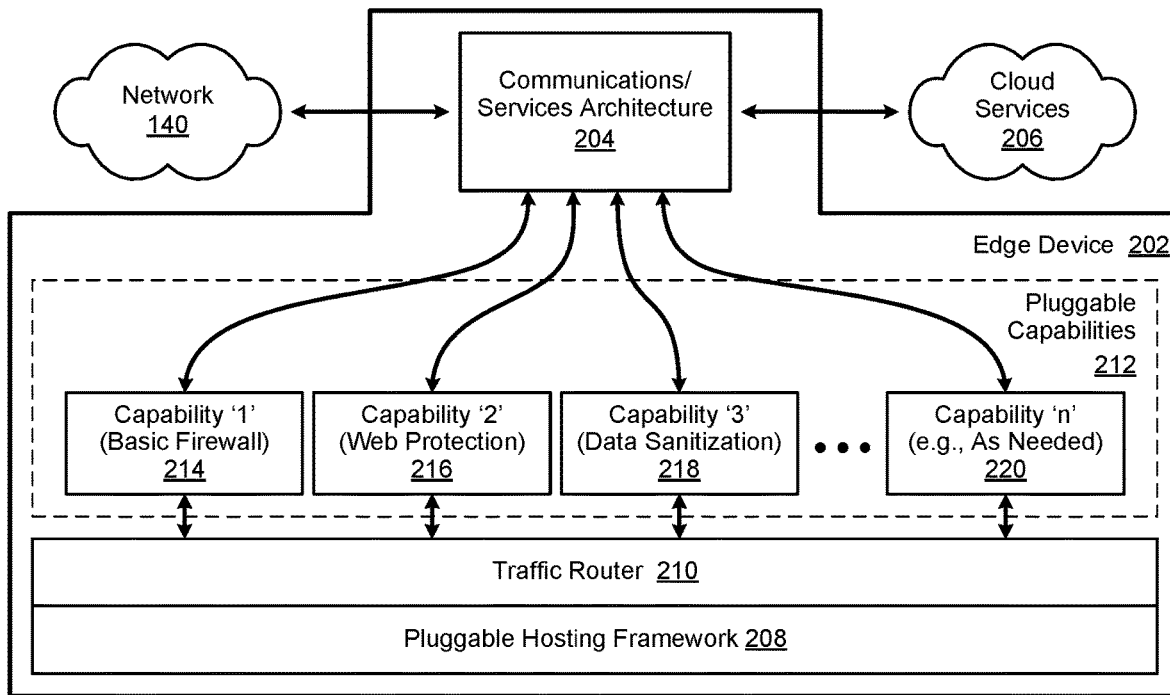
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
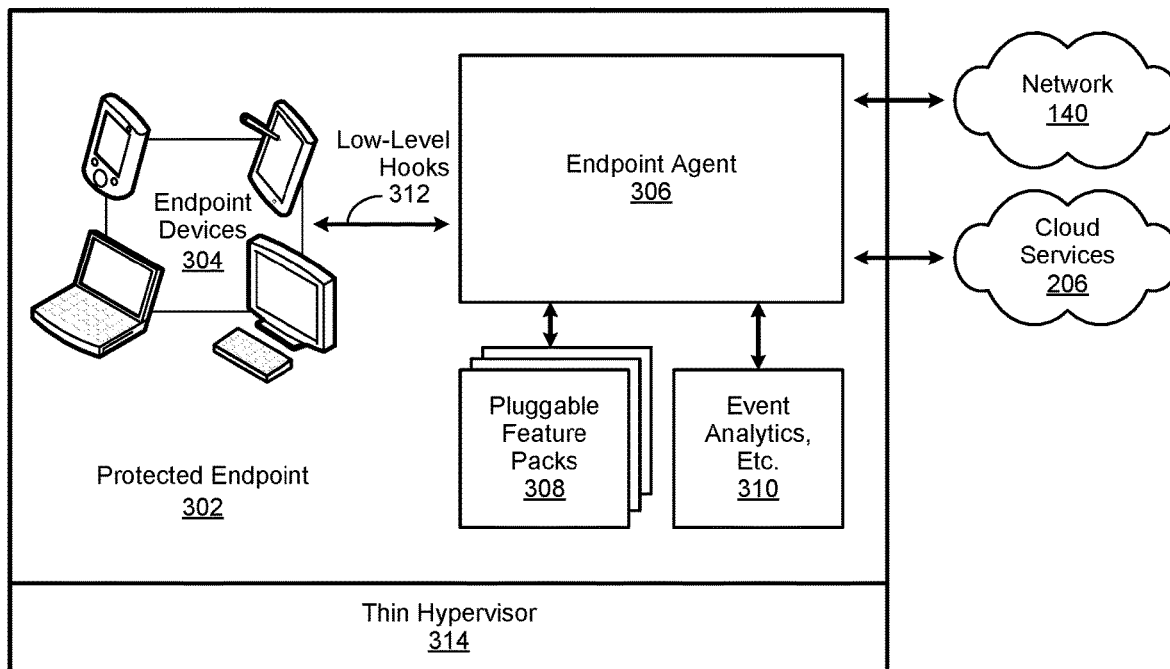
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as timestamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by an entity that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors 604. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
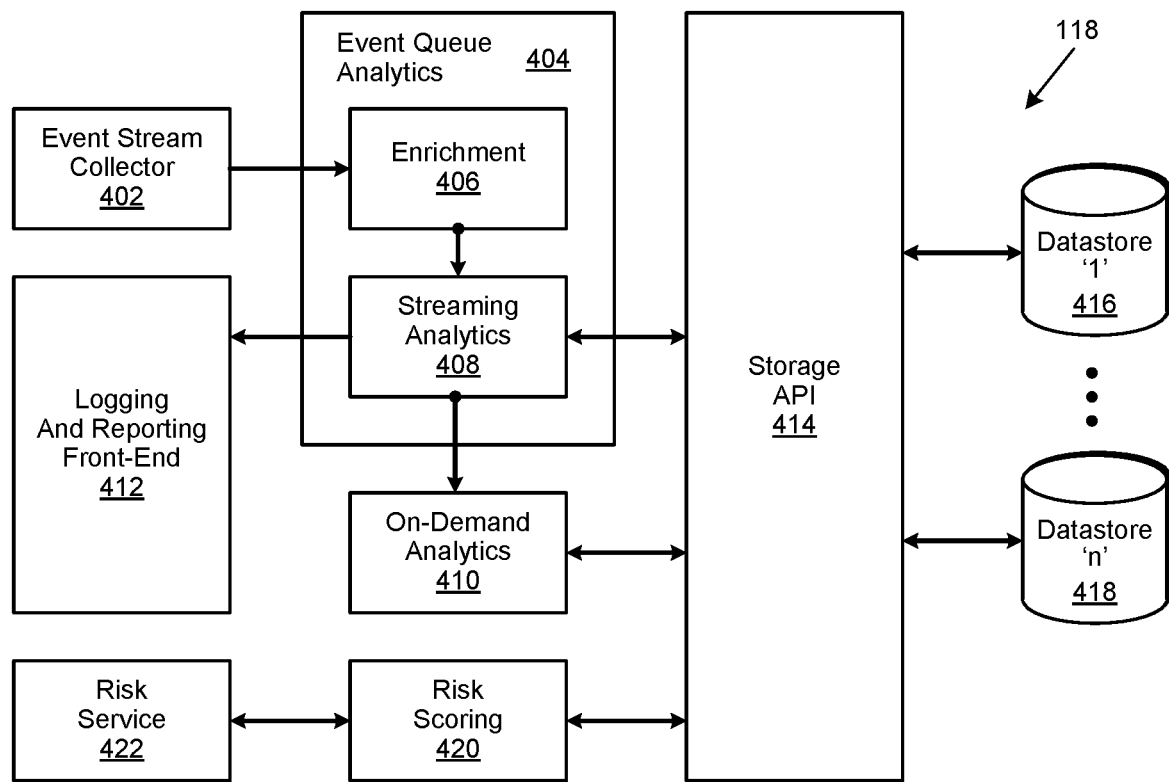
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 118 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various user behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 406 to a streaming 408 analytics module. In turn, the streaming 408 analytics module may provide some or all of the enriched user behavior information to an on-demand 410 analytics module. As used herein, streaming 408 analytics broadly refers to analytics performed in near real-time on enriched user behavior information as it is received. Likewise, on-demand 410 analytics broadly refers herein to analytics performed, as they are requested, on enriched user behavior information after it has been received. In certain embodiments, the enriched user behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched user behavior associated with a particular interval of, or point in, time. In certain embodiments, the streaming 408 or on-demand 410 analytics may be performed on enriched user behavior associated with a particular user, group of users, one or more entities, or a combination thereof. In certain embodiments, the streaming 408 or on-demand 410 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing a user profile, as described in greater detail herein. In certain embodiments, the risk management service 422 may be implemented to perform operations associated with detecting anomalous, abnormal, unexpected or malicious user behavior and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
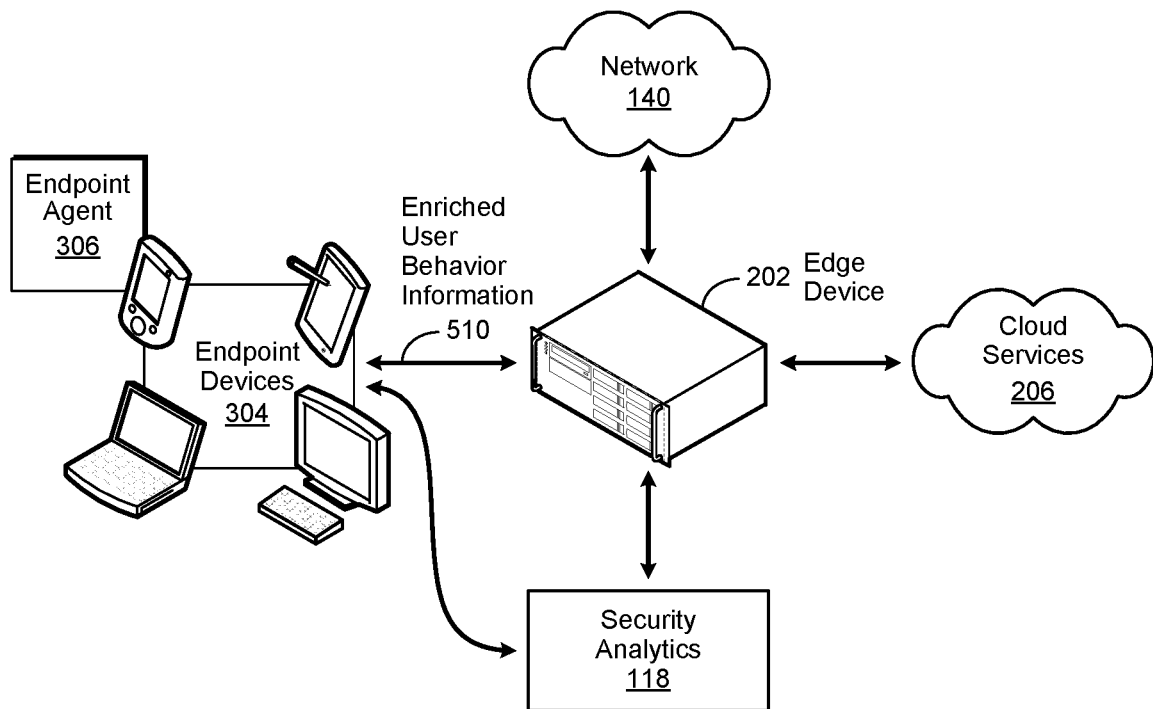
FIG. 5 is a simplified block diagram of a security analytics system.

FIG. 5 is a simplified block diagram of the operation of a security analytics system implemented in accordance with an embodiment of the invention. In certain embodiments, the security analytics system 118 may be implemented to perform operations associated with detecting anomalous, abnormal, unexpected or malicious user behavior, as described in greater detail herein. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain user behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing a user profile, detecting anomalous, abnormal, unexpected or malicious user behavior, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
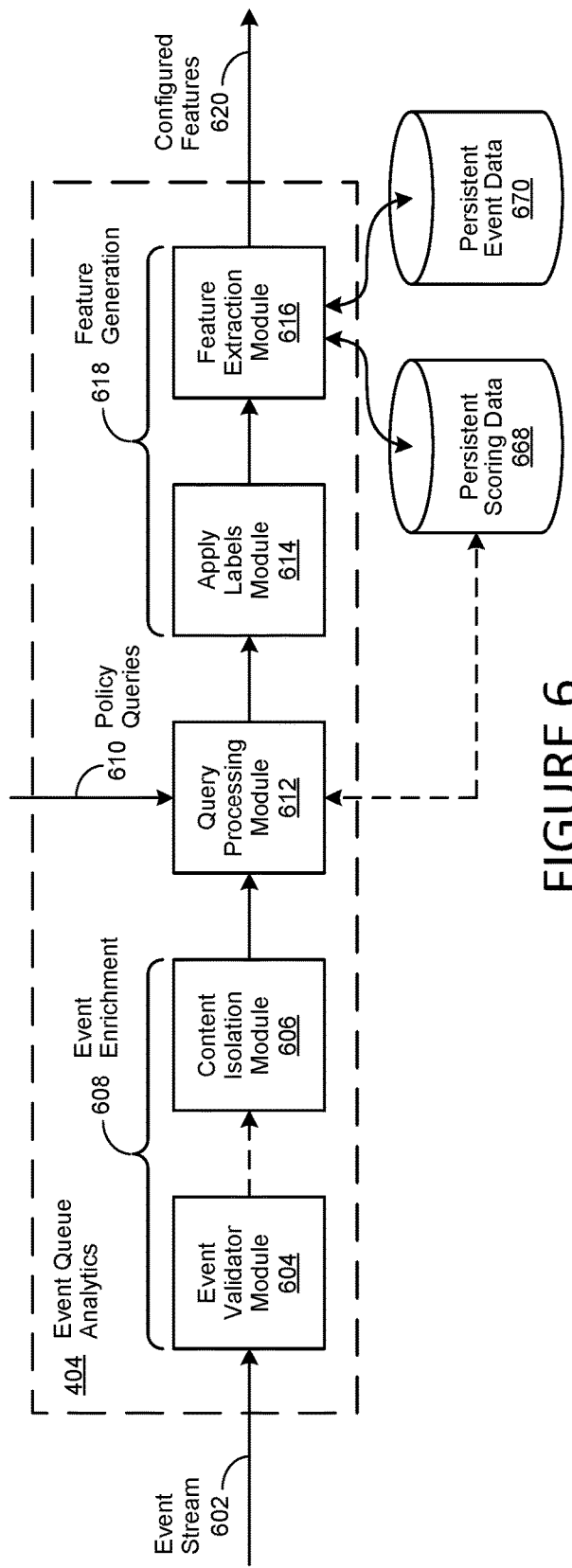
FIG. 6 is a generalized process flow diagram of the performance of event queue analytics operations.

FIG. 6 is a generalized process flow diagram of the performance of event queue analytics operations implemented in accordance with an embodiment of the invention. As used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To continue the example, the recipient of the email may open the infected binary file, and as a result, infect their computer with malware. To further continue the example, the act of opening the infected binary file is directly associated with a user behavior enacted by the second user. However, the infection of the email recipient's computer by the infected binary file is indirectly associated with the described user behavior enacted by the second user.

As likewise used herein, an entity broadly refers to something that exists as itself, whether physically or abstractly. In certain embodiments, an entity may be an individual user, a group, an organization, or a government. In certain embodiments, an entity may likewise be an item, a device, such as endpoint 304 and edge 202 devices, a network, such as an internal or external network, a domain, an operation, or a process. In certain embodiments, an entity may be a resource, such as a geographical location or formation, a physical facility, such as a venue, various physical security devices, a system, shared devices, such as printer, scanner, or copier, a data store, or a service, such as a service operating in a cloud environment.

In various embodiments, a security analytics system, described in greater detail herein, may be implemented to process certain entity information associated with an event. As used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

As likewise used herein, a security policy broadly refers to a combination of a rule and an associated action, where the rule defines an event, an allowable behavior, or a combination thereof, and the action describes a corresponding response should the bounds of the rule be met or exceeded. In certain embodiments, the behavior may include a user behavior, described in greater detail herein. In certain embodiments, the rule may include one or more parameters, factors, limits, restrictions, constraints, numeric values, numeric operators, Boolean operators, or a combination thereof. In certain embodiments, the action may include a response, a function, an operation, a procedure, a process, a method, or a combination thereof. In certain embodiments, the action may be performed automatically, semi-automatically, or manually.

As an example, a security policy may include a rule that an email, or a corresponding attachment, contain no more than two Social Security Numbers. In this example, the associated action may be not allowing the email to be sent to its intended recipient, quarantining the email for investigation, and notifying a security administrator to perform the investigation. To continue the example, a user may attempt to illicitly send an email with an attached spreadsheet containing Social Security Numbers, and other sensitive personal information (SPI), associated with a large group of employees to a rival organization. As a result of the security policy being enforced, the rival organization would be prevented from receiving the email, which would also be quarantined for investigation by a security administrator.

In various embodiments, the security analytics system may be implemented to use certain entity identifier information to ascertain the identity of an associated entity at a particular point in time. As used herein, entity identifier information broadly refers to an information element of an entity that can be used to ascertain or corroborate the identity of an associated entity at a particular point in time. In certain embodiments, the entity identifier information may include user authentication factors, user profile attributes, location data, information associated with various endpoint and edge devices, internal and external networks, resource entities, or a combination thereof.

In various embodiments, the entity identifier information may include certain temporal information. As used herein, temporal information broadly refers to a measure of time (e.g., a date, timestamp, etc.), a measure of an interval of time (e.g., a minute, hour, day, between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, interacting with a physical security device or shared devices, and entering a physical facility. Other examples of temporal events include uploading, transferring, downloading, modifying, or deleting data, such as data stored in a datastore, or accessing a service. Yet other examples of temporal events include user/user interactions between two or more users, user/device interactions between a user and a device, user/network interactions between a user and a network, and user/resource interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the security analytics system may be implemented to use information associated with such temporal resolution of an entity's identity to assess the risk associated with a particular entity, at a particular point in time, and adaptively respond with an associated response. In certain embodiments, the security analytics system may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time in combination with its associated contextual information. Consequently, the security analytics system may be more oriented in various embodiments to risk adaptation than to security administration.

In certain embodiments, the security analytics system may be implemented to detect anomalous, abnormal, unexpected or malicious user behavior by determining the probabilities of various possible outcomes occurring within a particular sample space. A sample space, as likewise used herein, broadly refers to the set of all possible outcomes of a particular phenomenon being observed. In certain embodiments, the phenomenon being observed may be an event, described in greater detail herein. In various embodiments, the phenomenon being observed is a matter of design choice.

In certain embodiments, the sample may be the occurrence of a feature associated with a corresponding event. In certain embodiments, such a feature may be associated with anomalous, abnormal, unexpected or malicious user behavior, as described in greater detail herein. In certain embodiments, the occurrence of an unlikely feature associated with a particular entity may result in the generation of a corresponding risk score. In certain embodiments, the generation of a corresponding risk score may include computing the aggregation of occurrences of certain unlikely features with which an entity may be associated.

In certain embodiments, the resulting risk score may be assigned, or otherwise associated, with the entity associated with the occurrence of an unlikely feature. In certain embodiments, the assigned risk score may be implemented to reflect a security risk corresponding to the entity associated with the occurrence of the unlikely feature. In certain embodiments, multiple occurrences of an unlikely feature within a particular period of time may increase an assigned risk score.

In certain embodiments, the event queue analytics 404 operations may be implemented to determine whether or not a feature associated with a particular document matches one or more policy queries 610. In certain embodiments, the document may be associated with a particular event. As used herein, a document broadly refers to a body of content. In certain embodiments, such content may include text, unstructured data, structured data, graphical images, photographs, audio recordings, video recordings, biometric information, metadata, and so forth. In certain embodiments, the policy query 610 may include data, metadata, or a combination thereof, related to an event.

In certain embodiments the policy queries 610 may be defined in a Domain Specific Language. As likewise used herein, a Domain Specific Language (DSL) broadly refers to a computer language specialized to a particular application domain. Examples of DSLs include Hypertext Mark-up Language (HTML) for web pages, Mathematica® for symbolic mathematics, Structured Query Language (SQL) for relational database queries, and Query DSL (QDSL) for Elasticsearch queries.

Referring now to FIG. 6, event queue analytics 404 operations may be initiated in certain embodiments by individual events in an event stream 602 being received and enriched by various event enrichment 608 modules. As used herein, event enrichment broadly refers to performing certain data enrichment operations and processes associated with enriching data associated with a particular event in the event stream 602. As likewise used herein, data enrichment broadly refers to various operations and processes typically used to enhance, refine or otherwise improve raw data.

Examples of geographic data enrichment may include the use of postal code, county name, longitude and latitude, and political district data, while examples of behavioral data enrichment may include purchase, credit risk, and preferred communication channel data. Likewise, examples of demographic data enrichment may include the use of income, marital status, and education data, while examples of psychographic data enrichment may include interests and political affiliation data.

In certain embodiments, event enrichment 608 may include matching certain incoming events in the event stream 602 with existing event data. In certain embodiments, event enrichment 608 may include deleting certain data associated with certain incoming events in the event stream 602. For example, certain data associated with various incoming events may be determined to be irrelevant to the detection of anomalous, abnormal, unexpected or malicious user behavior. In certain embodiments, the method by which data associated with various incoming events is determined to be irrelevant is a matter of design choice.

In certain embodiments, event enrichment 608 may include correcting invalid data associated with certain incoming events in the event stream 602. In certain embodiments, event enrichment 608 may include interpolating data associated with certain incoming events in the event stream 602 with other event data. In certain embodiments, the existing event data may be stored in a repository of persistent event data 670.

For example, an event in the event stream 602 may be associated with a first user attaching a binary file to an email addressed to a second user. In this example, the event enrichment 608 process may include determining the file type of the attachment. Likewise, the event enrichment 608 process may include determining the size of the attachment, the date and time of the email, the address of the originating email server, the email addresses of the first and second user, and so forth. In certain embodiments, the event enrichment 608 process may include associating annotations or other metadata corresponding to such determinations with the event.

In certain embodiments, the event enrichment 608 modules may include an event validator module 604. In certain embodiments, the event validator 604 module may be implemented to perform data validation operations on data associated with a particular event. As used herein, data validation broadly refers to various operations and processes associated with data cleansing to ensure data quality. As likewise used herein, data cleansing broadly refers to the process of detecting, correcting, and possibly removing, corrupted or inaccurate elements from a data set. In various embodiments, data cleansing operations may include identifying incomplete, incorrect, inaccurate, or irrelevant data elements and then replacing, modifying or deleting certain data elements that fail to meet certain data use parameters.

In certain embodiments, the event validator 604 module may be implemented to perform data validation operations without the use of statistical data. In certain embodiments, the event validator 604 module may be implemented to validate that event timestamps fall within a particular interval of time. In certain embodiments, the interval of time may be user-defined or otherwise configurable. In these embodiments, the definition of the interval of time is a matter of design choice. In certain embodiments, the event validator 604 module may be implemented such that an alias for an entity does not exceed a certain number of characters. In these embodiments, the number of characters is a matter of design choice. In certain embodiments, the event validator 604 module may be implemented such that any attested metadata has an expected, corresponding type. In these embodiments, the expected type of metadata is a matter of design choice.

In certain embodiments, the resulting validated event data may be consistent with substantively similar data sets used by the security analytics system to detect anomalous, abnormal, unexpected or malicious user behavior. Certain embodiments of the invention reflect an appreciation that the intent of such data validation is to ensure fitness, accuracy and consistency of data associated with a particular event. Certain embodiments of the invention likewise reflect an appreciation that such fitness, accuracy and consistency is advantageous when performing operations associated with detecting anomalous, abnormal, unexpected or malicious user behavior.

In certain embodiments, the event enrichment 608 modules may include modules (not shown) implemented to perform operations associated with de-duplication, entity resolution, attachment enrichment, domain enrichment, or some combination thereof. As used herein, de-duplication operations broadly refer to operations for determining a unique identity for an event based upon certain identifying fields. In certain embodiments, the identifying fields may include an externally-generated concept, idea or notion provided by the data source from which the event originated. In various embodiments, the identifying fields may include certain fields deemed to be fundamental to the identity of an event, or identification thereof. In certain embodiments, the value of an identifying field may be taken as imprecise with configurable granularity. For example, events that appear to be similar, and have timestamps within one minute of one another, may be considered duplicates.

As likewise used herein, entity resolution operations broadly refer to operations for resolving certain raw identifiers in input data to known entities. In certain embodiments, the resulting known entities may be used by a risk-adaptive protection system to detect anomalous, abnormal, unexpected or malicious user behavior. Likewise, as used herein, attachment enrichment operations broadly refer to operations for adding metadata based upon the quantity or type of data associated with an event. In certain embodiments, the metadata may be determined by extension, mime type headers, or mime type, as inferred from content associated with an event. As used herein, de-duplication operations broadly refer to operations for adding metadata based upon configurable categorizations of domains of entity identifiers associated with the event. In certain embodiments, the metadata may be internal or external to an organization, a particular business unit, government agency, and so forth.

In certain embodiments, the event enrichment 608 modules may likewise include a content isolation 606 module. In certain embodiments, the content isolation 606 module may be implemented to recognize and isolate certain types of recurring content. Examples of such recurring content may include standardized text, such as disclaimers or various types of boilerplate. Other examples of recurring content may include graphical images such as logos, icons, user avatars, and so forth. Certain embodiments of the invention reflect an appreciation that the inclusion of such recurring content in certain risk-adaptive protection operations may result in less effective detection of anomalous, abnormal, unexpected or malicious user behavior. Accordingly, certain embodiments of the invention may not include content that has been isolated by the content isolation 606 module when detecting anomalous, abnormal, unexpected or malicious user behavior, as described in greater detail herein.

In certain embodiments, the resulting, enriched events are then provided to a query processing 612 module. In certain embodiments, the query processing 612 module may be implemented to provide a streaming query framework. In certain embodiments, the streaming query framework may be implemented to process policy queries 610 in the performance of operations associated with detecting anomalous, abnormal, unexpected or malicious user behavior. In certain embodiments, such operations may be performed automatically, semi-manually, or manually in real-time, in batch mode, or on-demand.

In certain embodiments, the query processing 612 module may be implemented to receive certain policy queries 610 that include terms, features, tags, or other items of interest that may be associated with certain interrelated events. As used herein, a term broadly refers to a word, compound word, multi-word expression, numeric value, or alphanumeric string, which in certain contexts is associated with a particular meaning. In certain embodiments, a term may be associated with an event, a feature of an event, a classification label, a metadata tag label, or a combination thereof. In certain embodiments, the event, the feature of an event, the classification label, the metadata tag label, or a combination thereof, may in turn be associated with a particular security policy.

In certain embodiments, the query processing 612 module may be implemented to determine the commonalties between such policy queries 610. In certain embodiments, the query processing 612 module may be implemented to lazily evaluate such features or other terms of interest, as described in greater detail herein. In certain embodiments, the query processing 612 module may be implemented to only evaluate features or other terms of interest needed for the evaluation of a particular event. In certain embodiments, the query processing 612 module may be implemented to only evaluate the features or other terms of interest once when performing multiple policy queries 610.

In certain embodiments, the policy queries 610 may only be processed when the query processing 612 module is first initialized. In certain embodiments the policy queries 610 may be reprocessed periodically by the query processing 612 module during event collection if they have been added to or otherwise changed. In certain embodiments, such reprocessing may be performed by periodically polling for configuration changes and reinitialize the query processing 612 module as needed. Certain embodiments of the invention reflect an appreciation that such reinitializing of the query processing 612 module facilitates the reduction of a policy query 610, which involves executing preliminary query steps against reference data. In certain embodiments, the reference data may be stored in a repository of persistent scoring data 668.

As an example, a policy query 610 may be for events associated with employees whose salary is greater than some amount. In this example, the first step is to identify who those employees may be, and once they are identified, include them into the query when it is "reduced." It will be appreciated that failure to take this step may result in missing an employee got recently received a raise, and as a result, belongs in the group of identified employees. It will likewise be appreciated, that inclusion in the group of identified employees would typically not occur until the query processing 612 module was reinitialized. In certain embodiments, the query processing 612 module may be implemented to periodically recompile and re-reduce certain policy queries 610. In these embodiments, the method by which the decision is made to periodically recompile and re-reduce policy queries 610 is a matter of design choice.

In certain embodiments, the apply labels 614 module may be implemented to classify events by labeling them with associated classification labels. In certain embodiments, the labels applied by the apply labels 614 module may include associated metadata tags. In these embodiments, the method by which the apply labels 614 module selects a classification or metadata tag label, and the associated nomenclature thereof, is a matter of design choice.

As an example, an event may include a user downloading a file from a particular server address. In this example, the event may be classified as a "file download" with corresponding metadata of "server address." Accordingly, the apply labels 614 module may apply both a "file download" classification label and a "server address" metadata tag label to the event. As another example, an event may include an employee using a badge to enter a secured facility after normal work hours. In this example, the event may be classified as "facility access," with corresponding metadata of "secure" and "after hours." Accordingly, the apply labels 614 module may apply a "facility access" classification label as well as "secure" and "after hours" metadata tag labels to the event.

In certain embodiments, the labels applied by the apply labels 614 module may be user-generated, user-edited, or a combination thereof. In various embodiments, certain labels applied by the apply labels 614 module may be applied automatically, corresponding to certain sets of conditions. In certain embodiments, the labels applied by the apply labels 614 module may be automatically or manually removed from certain interrelated events, based on inspection. In certain embodiments, the labels applied by the apply labels 614 module to one event may automatically or manually be added to another event. In certain embodiments, such addition of labels may be based upon a policy query 610 to provide bulk labeling of certain interrelated events that may share common features or other characteristics. In various embodiments, such addition of labels may be implemented to flag certain interrelated events as part of a review workflow.

In certain embodiments, labeled events generated by the apply labels 614 module may be processed by the feature extraction 616 module to generate configured features 620. In certain embodiments, the apply labels 614 and feature extraction 616 module may be implemented in combination to perform feature generation 618 operations. As used herein, a feature, as it relates to an event, broadly refers to a property, characteristic or attribute of a particular event. As an example, features associated with a corpus of thousands of text-oriented messages (e.g., SMS, email, social network messages, etc.) may be generated by removing low-value words (i.e., stopwords), using certain size blocks of words (i.e., n-grams), or applying various text processing rules. Examples of features associated with an event may include the number of bytes uploaded, the time of day, the presence of certain terms in unstructured content, the respective domains associated with senders and recipients of information, and the Uniform Resource Locator (URL) classification of certain web page visits.

As likewise used herein, feature extraction broadly refers to the selection of a subset of features associated with an event. In various embodiments, the feature extraction 616 module may be implemented to perform transformation operations on a group of features associated with an event to generate a smaller set of derived features. In certain embodiments, the feature extraction 616 module may be implemented to construct derived probabilistic models based upon a particular group of features. In certain embodiments, certain features may be aggregated, from which the derived probabilistic models may be constructed. In certain embodiments, the resulting derived probabilistic models may be aggregated into a scenario. As used herein, a scenario is broadly defined as a group of derived probabilistic models associated with a corresponding group of interrelated events.

Certain embodiments of the invention reflect an appreciation that the generation of derived features may be advantageous as various features associated with a particular event may represent a non-linear pattern or relationship corresponding to anomalous, abnormal, unexpected or malicious user behavior. Likewise, having too many features that may share similar attributes may result in multi-collinearity or otherwise confound certain statistical models. Accordingly, the performance of certain feature extraction operations to extract a minimal number of derived features may result in more accurately detecting anomalous, abnormal, unexpected or malicious user behavior. In certain embodiments, the feature extraction 616 module may be implemented to use certain scoring data stored in a repository of persistent scoring data 668, or event data stored in a repository of persistent event data 670, or a combination thereof, to generate the configured features 620.

Figure 7:
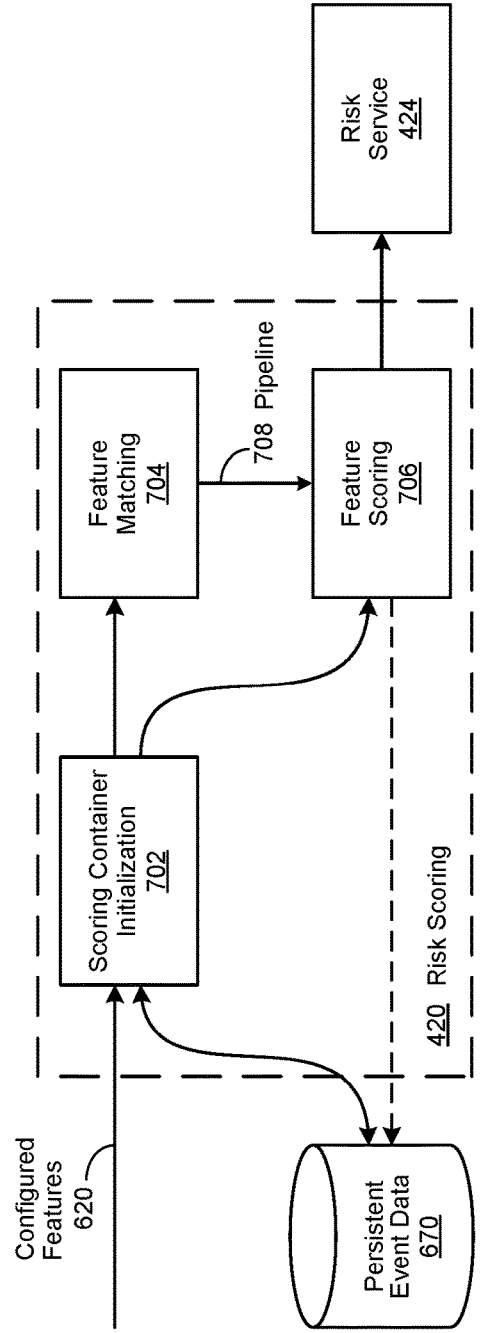
FIG. 7 is a generalized process flow diagram of the performance of risk scoring operations.

FIG. 7 is a generalized process flow diagram of the performance of risk scoring operations implemented in accordance with an embodiment of the invention. In certain embodiments, risk scoring operations 420, described in greater detail herein, are initiated by the receipt of configured features 620 by a container initialization 702 module. In certain embodiments, the scoring container initialization 702 module may be implemented to determine whether feature matching operations, likewise described in greater detail herein, should be performed on a particular configured feature 620.

In certain embodiments, the determination of whether or not feature matching operations are performed may be dependent upon on the type of the feature. In certain embodiments, the type of the feature may be determined by an associated feature definition. In these embodiments, the method by which a feature definition is defined, determined, or associated with a corresponding feature is a matter of design choice.

In certain embodiments, events are not inspected prior to initializing scoring containers. In certain embodiments, a repository of persistent event data 670 may be queried for a random sampling of events containing the configured features 620. In certain embodiments, the resulting random sampling of events may be used during various scoring container initialization 702 operations to generate an initial probability distribution of their associated features. In certain embodiments, the initial probability distribution of associated features may likewise be stored in the repository of persistent event data 670 for re-use.

If so, then feature matching operations, described in greater detail herein, are performed on the extracted feature by a feature matching 704 module. If not, or once the feature matching operations are performed by the feature matching 704 module, feature scoring operations are performed on the configured feature 620 by a feature scoring 706 module. In certain embodiments, a pipeline 708 may be implemented to provide the configured feature 620 to the feature scoring 706 module once associated feature matching operations have been performed by the feature matching 704 module.

In certain embodiments, the results of the feature scoring operations performed by the feature scoring 706 module may be stored in the repository of persistent event data 670. In certain embodiments, the resulting scored features may then be to generate associated risk scores. In certain embodiments, the resulting risk scores may be provided as a risk service 424. In certain embodiments, the risk scores may be used by a security analytics system in the performance of operations associated with detecting anomalous, abnormal, unexpected or malicious user behavior.

Figure 8A:
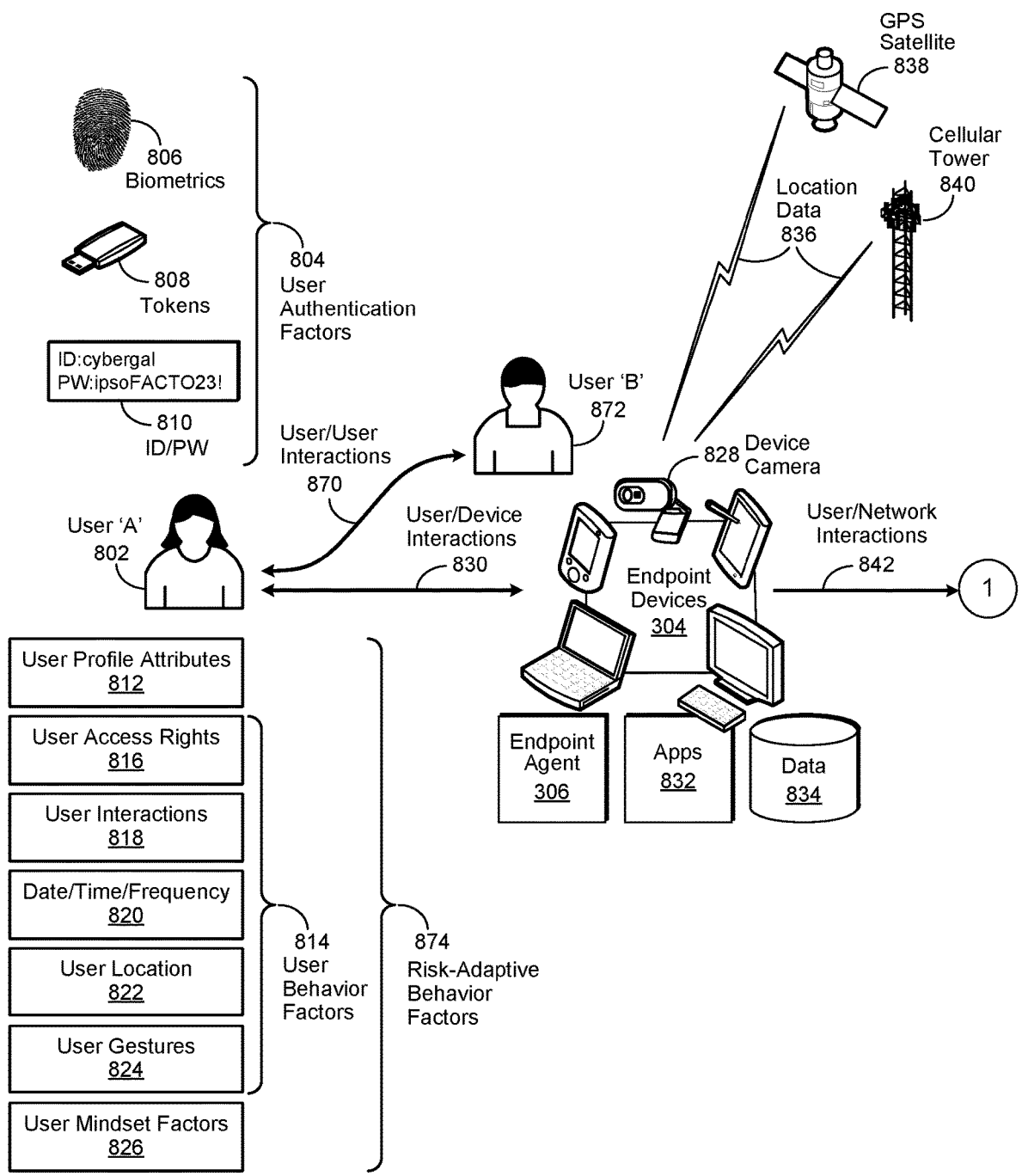
FIGS. 8a and 8b shows a block diagram of a security analytics system environment.
Figure 8B:
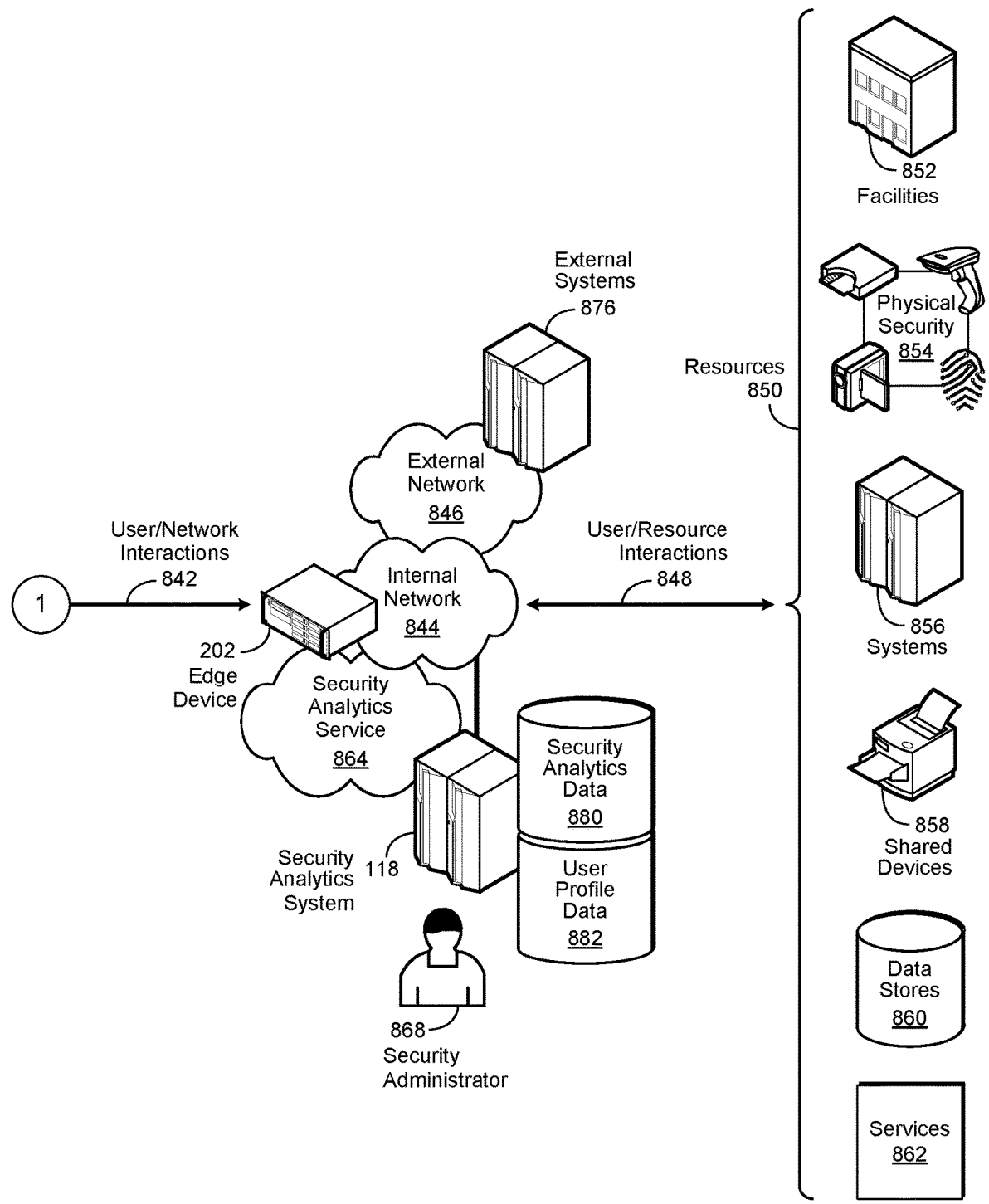

FIGS. 8a and 8b show a block diagram of a security analytics environment implemented in accordance with an embodiment of the invention. In certain embodiments, analyses performed by a security analytics system 118 may be used to identify anomalous, abnormal, unexpected or malicious behavior associated with an entity. In certain embodiments, the anomalous, abnormal, unexpected or malicious behavior may be identified at a particular point in time, during the occurrence of an event, the enactment of a user behavior, or a combination thereof.

In certain embodiments, information associated with a particular user behavior may be stored in a user profile. As used herein, a user profile broadly refers to a collection of information that uniquely describes a user's identity and their associated behavior, whether the behavior occurs within a physical realm or cyberspace. In certain embodiments, the user profile may be stored in a repository of user profile data 882. In certain embodiments, as described in greater detail herein, the user profile may include user profile attributes 812, user behavior factors 814, user mindset factors 826, or a combination thereof.

As used herein, a user profile attribute 812 broadly refers to data or metadata that can be used, individually or in combination with other user profile attributes 812, to uniquely ascertain the identity of an entity. In certain embodiments, the user profile attributes 812 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, financial account information, such as credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 804.

In certain embodiments, the user authentication factors 804 may be used to authenticate the identity of a user, such as user 'A' 802 or 'B' 872. In certain embodiments, the user authentication factors 604 may be used to ensure that a particular user, such as user 'A' 802 or 'B' 872, is associated with their corresponding user profile, rather than a user profile associated with another user. In certain embodiments, the user authentication factors 604 may include a user's biometrics 806 (e.g., a fingerprint or retinal scan), tokens 808 (e.g., a dongle containing cryptographic keys), user identifiers and passwords (ID/PW) 810, and personal identification numbers (PINs).

As used herein, a user behavior factor 814 broadly refers to information associated with a user's behavior, whether the behavior occurs within a physical realm or cyberspace. In certain embodiments, the user behavior factors 814 may include the user's access rights 816, the user's interactions 818, and the date/time/frequency 820 of those interactions 818. In certain embodiments, the user behavior factors 814 may likewise include the user's location 822 when the interactions 818 are enacted, and the user gestures 824 used to enact the interactions 818.

In certain embodiments, the user gestures 824 may include key strokes on a keypad, a cursor movement, a mouse movement or click, a finger swipe, tap, or other hand gesture, an eye movement, or some combination thereof. In certain embodiments, the user gestures 824 may likewise include the cadence of the user's keystrokes, the motion, force and duration of a hand or finger gesture, the rapidity and direction of various eye movements, or some combination thereof. In certain embodiments, the user gestures 824 may include various audio or verbal commands performed by the user.

In various embodiments, certain date/time/frequency 820 user behavior factors 814 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 812, user behavior factors 814, user mindset factors 826, or a combination thereof, to one or more instants in time. As an example, user 'A' 802 may access a particular system 856 to download a customer list at 3:47 PM on Nov. 3, 2017. Analysis of their user behavior profile indicates that it is not unusual for user 'A' 802 to download the customer list on a weekly basis. However, examination of their user behavior profile also indicates that user 'A' 802 forwarded the downloaded customer list in an email message to user 'B' 872 at 3:49 PM that same day. Furthermore, there is no record in their user behavior profile that user 'A' 802 has ever communicated with user 'B' 872 in the past. Moreover, it may be determined that user 'B' 872 is employed by a competitor. Accordingly, the correlation of user 'A' 802 downloading the customer list at one point in time, and then forwarding the customer list to user 'B' 872 at a second point in time shortly thereafter, is an example of societal time.

In a variation of the prior example, user 'A' 802 may download the customer list at 3:47 PM on Nov. 3, 2017. However, instead of immediately forwarding the customer list to user 'B' 872, user 'A' 802 leaves for a two week vacation. Upon their return, they forward the previously-downloaded customer list to user 'B' 872 at 9:14 AM on Nov. 20, 2017. From an ontological time perspective, it has been two weeks since user 'A' 802 accessed the system 856 to download the customer list. However, from a societal time perspective, they have still forwarded the customer list to user 'B' 872, despite two weeks having elapsed since the customer list was originally downloaded.

Accordingly, the correlation of user 'A' 802 downloading the customer list at one point in time, and then forwarding the customer list to user 'B' 872 at a much later point in time, is another example of societal time. More particularly, it may be inferred that the intent of user 'A' 802 did not change during the two weeks they were on vacation. Furthermore, user 'A' 802 may have attempted to mask an intended malicious act by letting some period of time elapse between the time they originally downloaded the customer list and when they eventually forwarded it to user 'B' 872. From the foregoing, those of skill in the art will recognize that the use of societal time may be advantageous in determining whether a particular user behavior is acceptable, anomalous, abnormal, unexpected or malicious.

As used herein, mindset factors 826 broadly refer to information used to determine the mental state of a user at a particular point in time, during the occurrence of an event, an enactment of a user behavior, or combination thereof. As used herein, mental state broadly refers to a hypothetical state corresponding to the way a user may be thinking or feeling. In certain embodiments, the user mindset factors 826 may include a personality type. Examples of known approaches for determining a personality type include Jungian types, Myers-Briggs type indicators, Keirsy Temperament Sorter, Socionics, Enneagram of Personality, and Eyseneck's three-factor model.

In certain embodiments, the mindset factors 826 may include various behavioral biometrics. As likewise used herein, a behavioral biometric broadly refers to a physiological indication of a user's mental state. Examples of behavioral biometrics may include a user's blood pressure, heart rate, respiratory rate, eye movements and iris dilation, facial expressions, body language, tone and pitch of voice, speech patterns, and so forth.

In certain embodiments, the security analytics system 118 may be implemented to process certain entity information associated with providing resolution of the identity of an entity at a particular point in time. In certain embodiments, the security analytics system 118 may be implemented to use information associated with certain user behavior elements to resolve the identity of an entity at a particular point in time. A user behavior element, as used herein, broadly refers to a discrete element of a user's behavior during the performance of a particular operation in a physical realm, cyberspace, or a combination thereof. In certain embodiments, such user behavior elements may be associated with a user/device 830, a user/network 842, a user/resource 848, a user/user 860 interaction, or a combination thereof.

As an example, user 'A' 802 may use an endpoint device 304 to browse a particular web page on a news site on the Internet. In this example, the individual actions performed by user 'A' 802 to access the web page are user behavior elements that constitute a user behavior. As another example, user 'A' 802 may use an endpoint device 304 to download a data file from a particular system 856. In this example, the individual actions performed by user 'A' 802 to download the data file, including the use of one or more user authentication factors 804 for user authentication, are user behavior elements that constitute a user behavior. In certain embodiments, the user/device 830 interactions may include an interaction between a user, such as user 'A' 802 or '13' 872, and an endpoint device 304.

In certain embodiments, the user/device 830 interaction may include interaction with an endpoint device 304 that is not connected to a network at the time the interaction occurs. As an example, user 'A' 802 or '13' 872 may interact with an endpoint device 304 that is offline, using applications 832, accessing data 834, or a combination thereof, it may contain. Those user/device 830 interactions, or their result, may be stored on the endpoint device 304 and then be accessed or retrieved at a later time once the endpoint device 304 is connected to the internal 844 or external 846 networks. In certain embodiments, an endpoint agent 306 may be implemented to store the user/device 830 interactions when the user device 304 is offline.

In certain embodiments, an endpoint device 304 may be implemented with a device camera 828. In certain embodiments, the device camera 628 may be integrated into the endpoint device. In certain embodiments, the device camera 828 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 828 may be implemented to capture provide user/device 830 interaction information to an endpoint agent 306. In various embodiments, the device camera 828 may be implemented to provide surveillance information related to certain user/device 830 or user/user 870 interactions. In certain embodiments, the surveillance information may be used by the security analytics system 118 to detect anomalous, abnormal, unexpected or malicious behavior associated with an entity, such as user 'A' 802 or user '13' 872. In certain embodiments, the entity may or may not be aware that the camera is providing such surveillance information.

In certain embodiments, the endpoint device 304 may be used to communicate data through the use of an internal network 844, an external network 846, or a combination thereof. In certain embodiments, the internal 844 and the external 846 networks may include a public network, such as the Internet, a physical private network, a virtual private network (VPN), or any combination thereof. In certain embodiments, the internal 844 and external 846 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 870 interactions may include interactions between two or more users, such as user 'A' 802 and 'B' 862. In certain embodiments, the user/user interactions 870 may be physical, such as a face-to-face meeting, via a user/device 830 interaction, a user/network 842 interaction, a user/resource 848 interaction, or some combination thereof. In certain embodiments, the user/user 870 interaction may include a face-to-face verbal exchange. In certain embodiments, the user/user 870 interaction may include a written exchange, such as text written on a sheet of paper. In certain embodiments, the user/user 870 interaction may include a face-to-face exchange of gestures, such as a sign language exchange.

In certain embodiments, temporal event information associated with various user/device 830, user/network 842, user/resource 848, or user/user 870 interactions may be collected and used to provide real-time resolution of the identity of an entity at a particular point in time. Those of skill in the art will recognize that many such examples of user/device 830, user/network 842, user/resource 848, and user/user 870 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint 304 or edge 202 device, a physical security device 854, a system 856, a shared device 858, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 856 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 836. In certain embodiments, the endpoint device 304 may be configured to receive such location data 836, which is used as a data source for determining the user's location 822. In certain embodiments, the location data 836 may include Global Positioning System (GPS) data provided by a GPS satellite 838. In certain embodiments, the location data 836 may include location data 836 provided by a wireless network, such as from a cellular network tower 840. In certain embodiments (not shown), the location data 636 may include various Internet Protocol (IP) or other network address information assigned to the endpoint 304 or edge 202 device. In certain embodiments (also not shown), the location data 836 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 852, physical security device 854, system 856, or shared device 858. As an example, the endpoint device 304 may be directly connected to an ingress/egress system, such as an electronic lock on a door or an access gate of a parking garage. As another example, the endpoint device 304 may be indirectly connected to a physical security device 854 through a dedicated security network.

In certain embodiments, the security analytics system 118 may be implemented to perform various risk-adaptive protection operations. Risk-adaptive, as used herein, broadly refers to adaptively responding to a risk associated with an electronically-observable user behavior. In various embodiments, the security analytics system 118 may be implemented to perform certain risk-adaptive protection operations by monitoring certain user behaviors, assess the corresponding risk they may represent, individually or in combination, and respond with an associated response. In certain embodiments, such responses may be based upon contextual information, described in greater detail herein, associated with a given user behavior.

In certain embodiments, various risk-adaptive behavior factors 874, likewise described in greater detail herein, may be used to perform the risk-adaptive protection operations. In certain embodiments, the risk-adaptive behavior factors 874 may include user profile attributes 812, user behavior factors 814, user mindset factors 826, or a combination thereof. In these embodiments, the risk-adaptive behavior factors 874 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 864. In certain embodiments, the security analytics service 864 may be implemented in a cloud environment familiar to those of skill in the art. In various embodiments, the security analytics system 118 may use data stored in a repository of security analytics data 880 in the performance of certain security analytics operations, described in greater detail herein. Those of skill in the art will recognize that many such embodiments are possible. Accordingly, the foregoing is not intended to limit the spirit, scope or intent of the invention.

Figure 9:
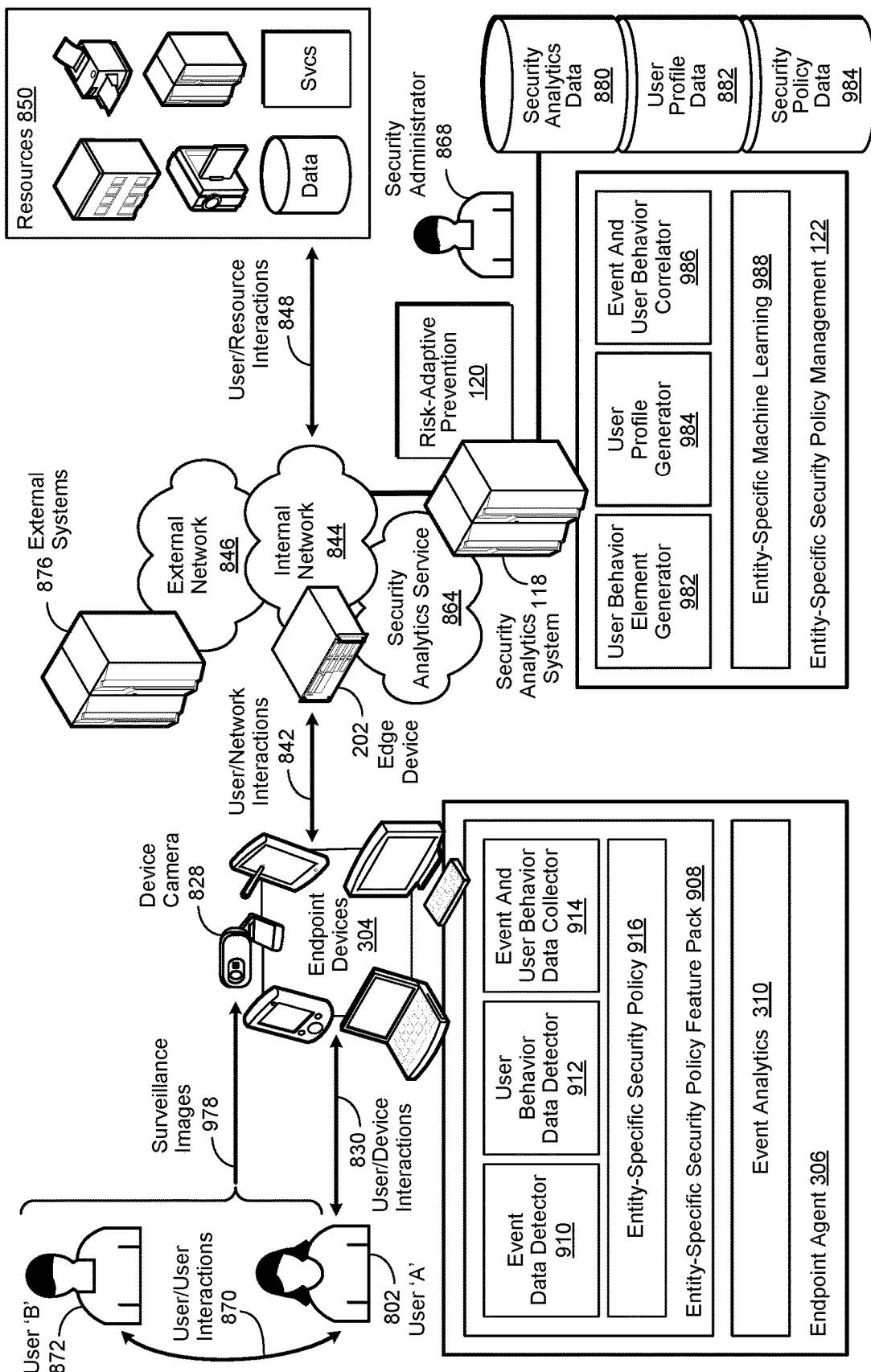
FIG. 9 is a functional block diagram showing the operation of a security analytics system.

FIG. 9 is a functional block diagram showing the operation of a security analytics system implemented in accordance with an embodiment of the invention. In certain embodiments, the security analytics system 118 may be implemented to automatically generate a security policy. In various embodiments, certain electronically-observable information related to an organization, described in greater detail herein, is gathered and converted into electronic information related to the organization. In various embodiments, the electronically-observable information comprises electronically-observable user interactions. In various embodiments, the electronically-observable information comprises user to device, user to network, user to resource, and user to user interactions, or a combination thereof. In various embodiments, the electronically-observable information comprises inbound collected data such as machine data. In certain embodiments, the inbound collected data comprises one or more of software as a service (SaaS) log data, data related to virtual machines, e.g. containers (docker, kubernettes orchestration), Lambda functions, data related to Amazon Web Services (AWS), data related to unikernels, etc.

In certain embodiments, the resulting electronic information may be used by the security analytics system 118 to automatically generate a plurality of organization-specific rules. In certain embodiments, each automatically-generated, organization-specific rule may have a corresponding action, described in greater detail herein, which may likewise be automatically generated by the security analytics system 118. In certain embodiments, the analytics system 118 may be implemented to use the automatically-generated, organization-specific rules, and their corresponding actions, to automatically generate an organization-specific security policy. As used herein, an organization-specific security policy broadly refers to an aggregation of a plurality of entity-specific security policies.

As used herein, an entity-specific security policy 916 broadly refers to a risk-adaptive security policy, whose definition, rules, and enforcement adaptively evolves over time according to electronically-observed user behavior data, likewise described in greater detail herein, corresponding to an associated entity. As likewise used herein, a risk-adaptive security policy broadly refers to a security policy implemented to be revised by a security analytics system 118, described in greater detail herein, to adaptively remediate risk associated with certain user behaviors. In certain embodiments, the evolving of an entity-specific security policy may result in a corresponding evolving of an associated organization-specific rule. In certain embodiments, the entity-specific security policies 916, and their associated organization-specific security policy, may be stored in a repository of security policy data 984.

In various embodiments, the security analytics system 118 may be implemented to adaptively evolve an entity-specific security policy 916. As used herein, adaptively evolving an entity-specific security policy 916 broadly refers to revising the rules of an entity-specific security policy 916 associated with an entity according to the enactment of certain electronically-observed user behavior corresponding to an event. In certain embodiments, the security analytics system 118 may be implemented to use an entity-specific security policy 916 to adaptively respond to electronically-observed user behavior of an associated entity, as described in greater detail herein.

In certain embodiments, the security analytics system 118 may be implemented to include a risk-adaptive prevention module 120, an entity-specific security policy management module 122, or both. In certain embodiments, the security analytics system 118 may likewise be implemented to include repositories of security analytics data 880, user profile data 882, security policy data 984, or a combination thereof. In certain embodiments, the risk-adaptive protection system 120 may be implemented to detect anomalous, abnormal, unexpected or malicious user behavior and adaptively respond to mitigate risk, as described in greater detail herein.

In various embodiments, the security analytics system 118 may be implemented to use the entity-specific security policy management system 122 to perform certain security policy management operations. In various embodiments, the security policy management operations may include adaptively evolving an entity-specific security policy 916 associated with an entity according to the enactment of certain electronically-observed user behavior corresponding to an event. In certain embodiments, the security policy management operations may include using an entity-specific security policy 916 to adaptively respond to electronically-observed user behavior of an associated entity.

In certain embodiments, the security analytics system 118 may be implemented to monitor user behavior associated with a user, such as user 'A' 802 or user 'B' 872. In certain embodiments, the user behavior may be monitored during user/device 830, user/network 842, user/resource 848, user/user 870 interactions, or a combination thereof. In certain embodiments, the user/user 870 interactions may occur between a first user, such as user 'A' 802, and a second user, such as user 'B' 872. In certain embodiments, as described in greater detail herein, an endpoint agent 306 may be implemented on an endpoint device 304 to perform the user behavior monitoring. In various embodiments, the endpoint agent 306 may be implemented to use surveillance images 978 collected by a device camera 828 implemented with the endpoint device 304 to perform certain user behavior monitoring operations, as likewise described in greater detail herein.

In various embodiments, the user behavior monitoring may be performed to detect anomalous, abnormal, unexpected or malicious user behavior when certain content is being accessed by a particular user. As an example, such user behavior monitoring operations may not be performed when a user is simply browsing various websites. However, they may be performed whenever sensitive, confidential or proprietary content is being displayed within the UI of an associated endpoint device 304. In certain of these embodiments, the user behavior monitoring operations may include implementation of the endpoint agent 306 to activate the device camera 828 to capture surveillance images 978.

As an example, the device camera 828 may be activated to determine the identity of a viewer when sensitive, confidential or proprietary is displayed within the UI of a particular endpoint device 304. To continue the example, user 'A' 802 may be authorized to view the displayed content, while user 'B' 872 may not. In this example, the display of the sensitive, confidential or proprietary content may be discontinued if the processing of the captured surveillance images 978 indicates the viewer is not authorized to view it. In these embodiments, the determination of under what circumstances the device camera 828 is activated, and the manner in which it is implemented to capture surveillance images 978 during various user behavior operations, is a matter of design choice.

In certain embodiments, the user behavior may be monitored by the endpoint agent 306 during user/device 830 interactions between a user, such as user 'A' 802, and an endpoint device 304. In certain embodiments, the user behavior may be monitored by the endpoint agent 306 during user/network 842 interactions between user 'A' 802 or user 'B' 872, and a network, such as an internal 844 or external 846 network. In certain embodiments, the endpoint agent 306 may be implemented to perform the monitoring of user behavior in combination with the security analytics system 118, the risk-adaptive 120 module, and the entity-specific security policy management 122 module.

In certain embodiments, the endpoint agent 306 may be implemented to include an entity-specific security policy feature pack 908 and an analytics 310 module, described in greater detail herein. In certain embodiments, the entity-specific security policy feature pack 908 may be implemented to include an event data detector 910 module, a user behavior data detector 912 module, and an event and user behavior data collector 914 module. In certain embodiments, the event data detector 910 module may be implemented to detect event data, likewise described in greater detail herein, resulting from user/device 830, user/network 842, user/resource 848, and user/user 870 interactions. In certain embodiments, the user behavior data detector 912 module may be implemented to detect user behavior data, described in greater detail herein, resulting from user/device 830, user/network 842, user/resource 848, and user/user 870 interactions.

In certain embodiments, the user behavior data detector 912 module may be implemented to receive surveillance images 978 provided by the device camera 828. In certain embodiments, the surveillance images 978 may be in the form of one or more individual digital images. In certain embodiments, the surveillance images 978 may be in the form of a video recording. In certain embodiments, the video recording may be provided to the user behavior data detector 912 in the form of a continuous sequence of video frames. In certain embodiments, the continuous sequence of video frames may be collected by the user behavior data detector 912 to provide full-motion video when played back. In certain embodiments, the video recording images may be provided to the user behavior data detector 912 in the form of streaming media, familiar to those of skill in the art.

In certain embodiments, the event and user behavior data collector 914 module may be implemented to collect the event data and user behavior data respectively detected by the event data detector 910 module and the user behavior data detector 912 into a stream of event data, likewise described in greater detail herein. In certain embodiments, the endpoint agent 306 may be implemented to communicate the resulting stream of event data to the security analytics 118 system. In certain embodiments, the entity-specific security policy feature pack 908 may be implemented to include an entity-specific security policy 916, described in greater detail herein. In certain embodiments, revisions to the entity-specific security policy 916 may be performed by the risk-adaptive protection 120 module. In certain embodiments, revisions to the entity-specific security policy 916 may be made in response to the detection of anomalous, abnormal, unexpected or malicious user behavior associated with visual hacking.

In certain embodiments, the risk-adaptive prevention 120 module may be implemented to assess the risk of revising one or more rules, or enforcement actions, associated with an entity-specific security policy 916. In certain embodiments, the determination of whether the assessed risk is acceptable is a matter of design choice. In certain embodiments, the determination may be made automatically, semi-automatically, or manually. As an example, the risk-adaptive prevention 120 module may be implemented to determine whether the assessed risk is within a particular risk range, or within certain security operational parameters, and if so, automatically decide the assessed risk is acceptable. As another example, the risk-adaptive prevention 120 module may be implemented to notify a security administrator 868 of the assessed risk. In this example, the security administrator 868 may decide whether or not the assessed risk is acceptable. In certain embodiments, the risk-adaptive prevention system 120 may likewise be implemented to notify a security administrator 668 of the risk-adaptive measures it has enacted.

In certain embodiments, the entity-specific security policy management 122 module may be implemented to include a user behavior element generator 982 sub-module, a user profile generator 984 sub-module, and an event and user behavior correlator 986 sub-module. In certain embodiments, the user behavior element generator 982 sub-module may be implemented to process the stream of event data provided by the endpoint agent 306 to generate user behavior elements, described in greater detail herein.

In certain embodiments, the user profile generator 984 sub-module may be implemented to process the stream of event data provided by the endpoint agent 306 and the user behavior elements generated by the user behavior element generator 982 sub-module to generate a user profile, likewise described in greater detail herein. In certain embodiments, the user profile generator 984 sub-module may be implemented to append the user behavior elements generated by the user behavior generator 982 sub-module to an existing user profile. In certain embodiments, the resulting user profiles may be stored in the repository of user profile data 882. In certain embodiments, the event and user behavior correlator 986 sub-module may be implemented to correlate the resulting user behavior elements to a particular event.

In certain embodiments, the entity-specific security policy management 122 module may likewise be implemented to include an entity-specific machine learning 988 sub-module. In various embodiments, certain machine learning approaches familiar to those of skill in the art may be implemented to train the entity-specific learning 988 sub-module to recognize a true positive, a false positive, a true negative, a false negative, or indeterminate occurrence of anomalous, abnormal, unexpected or malicious user behavior. In certain embodiments, the machine learning approaches may include supervised learning approaches, unsupervised learning approaches, or a combination thereof.

As used herein, supervised learning broadly refers to a machine learning approach for inferring a function from labeled training data. The training data typically consists of a set of training examples, with each example consisting of an input object (e.g., a vector) and a desired output value (e.g., a supervisory signal). In certain embodiments, a supervised learning algorithm may be implemented to analyze the training data and produce an inferred function, which in turn can be used for mapping new examples.

As likewise used herein, unsupervised learning broadly refers to a machine learning approach for finding non-obvious or hidden structures within a set of unlabeled data. In certain embodiments, an unsupervised machine learning algorithm is not given a set of training examples. Instead, it attempts to summarize and explain key features of the data it processes. Examples of unsupervised learning approaches include clustering (e.g., k-means, mixture models, hierarchical clustering, etc.) and latent variable models (e.g., expectation-maximization algorithms, method of moments, blind signal separation techniques, etc.).

As used herein, a true positive broadly refers to a correct conclusion resulting from correctly identifying the presence of one or more indicators of anomalous, abnormal, unexpected, or malicious user behavior within a set of event stream data. As likewise used herein, a false positive broadly refers to an incorrect conclusion resulting from incorrectly identifying the presence of one or more indicators or anomalous, abnormal, unexpected, or malicious user behavior within a set of event stream data. Likewise, as used herein, a true negative broadly refers to a correct conclusion resulting from correctly identifying the absence of one or more indicators of anomalous, abnormal, unexpected, or malicious user behavior within a set of event stream data. A false negative, as likewise used herein, broadly refers to an incorrect conclusion resulting from failing to identify one or more indicators of anomalous, abnormal, unexpected, or malicious user behavior within a set of event stream data. As likewise used herein, an indeterminate occurrence of anomalous, abnormal, unexpected, or malicious user behavior broadly refers to an inconclusive conclusion resulting from being unable to discern one or more indicators of such behavior within a set of event stream data.

In certain embodiments, a false positive, false negative, or indeterminate depiction, may be generated as a result of the defined bounds of an entity-specific security policy's 916 associated rule being met or exceeded as a result the occurrence of a legitimate event, the enactment of a legitimate behavior, or a combination thereof. In various embodiments, certain security analytics data 880, user profile data 882, security policy data 984, or a combination thereof, may be used to train the entity-specific machine learning 988 sub-module. In certain embodiments, the training of the entity-specific machine learning 988 sub-module may result in improved recognition of a true positive, a false positive, a true negative, a false negative, or indeterminate occurrence of anomalous, abnormal, unexpected or malicious user behavior.

In various embodiments, certain risk-adaptive protection operations, described in greater detail herein, may be performed by the risk-adaptive prevention 120 module in response to detection of an occurrence of anomalous, abnormal, unexpected or malicious user behavior and adaptively respond to mitigate associated risk. In various embodiments, the risk-adaptive protection operations may include correlating the detection of an occurrence of anomalous, abnormal, unexpected or malicious user behavior to certain event and user behavior information. In certain embodiments, the surveillance image correlator 790 sub-module may be implemented to perform such correlation.

Figure 10:
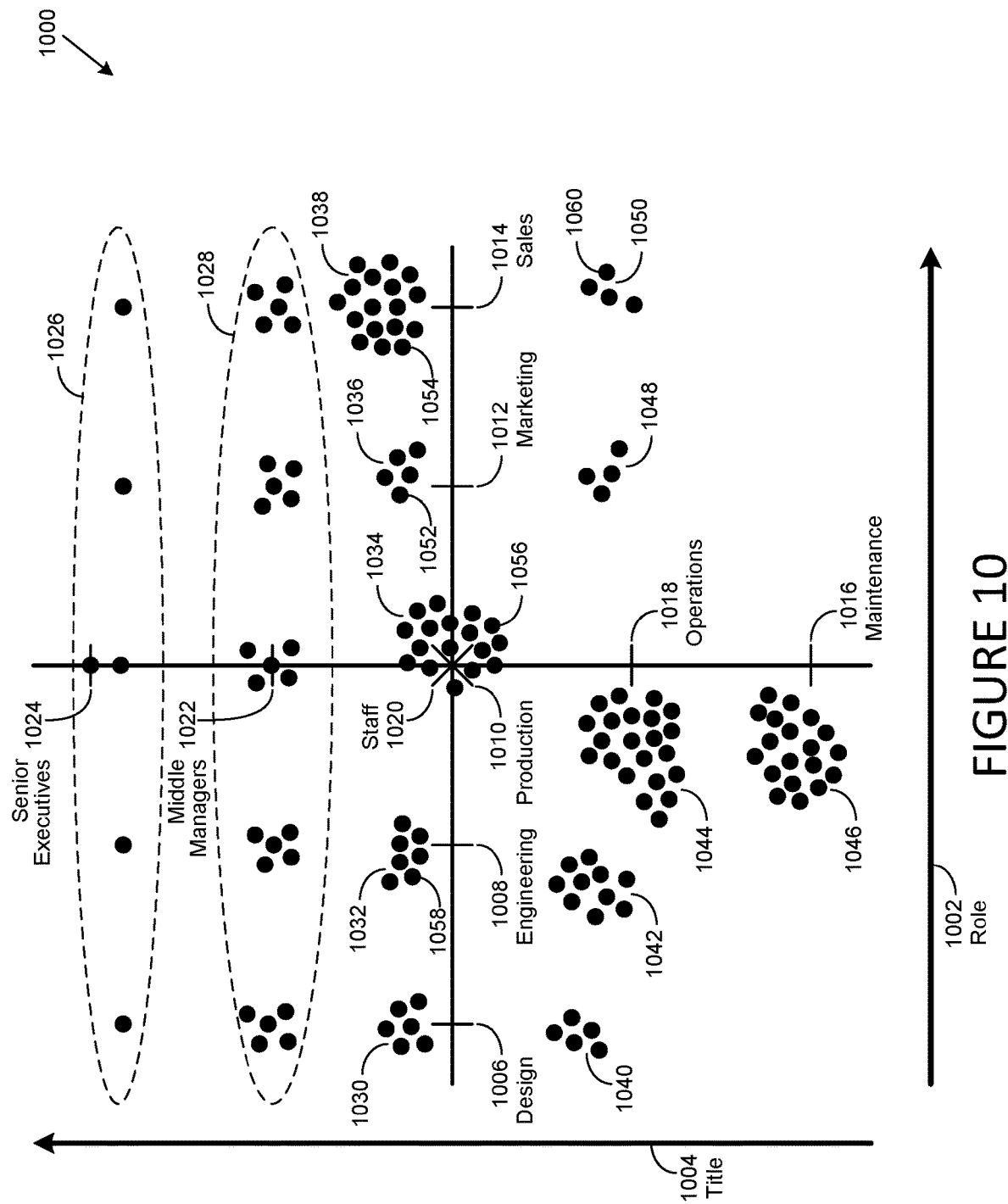
FIG. 10 shows an example of k-means clustering.

FIG. 10 shows an example of k-means clustering implemented in accordance with an embodiment of the invention to identify entity-specific security policies corresponding to entities having similar user behavior profiles. Skilled practitioners of the art will be familiar with k-means clustering, which is a method of vector quantization commonly used for cluster analysis in data mining. In typical implementations, k-means clustering partitions n observations into k clusters, in which each observation belongs to the cluster with the nearest mean, which serves as the prototype of the cluster. As a result, the data space is partitioned into Voronoi cells, which relates to the partitioning of a plane into regions based on distance to points, or seeds, in a specific subset of the plane, where the points are specified beforehand. Likewise, each seed has a corresponding region consisting of all points closer to that seed than to any other.

Those of skill in the art will likewise be familiar with an associated approach to machine learning known as the k-nearest classifier, which is commonly used to classify new data into existing clusters. As commonly implemented, k-nearest classifier approaches employ the k-nearest neighbors (k-NN) algorithm for classification and regression, where the input consists of k closest training examples in the feature space. In these approaches, the output depends on whether the k-NN algorithm is used for classification or regression.

When the k-NN algorithm is used for classification, the output is a class membership, wherein an object is classified by a majority "vote" of its neighbors, with the object being assigned to the class most common among its k nearest neighbors. Accordingly, if k=1, then the object is simply assigned to the class of that single nearest neighbor. Likewise, when the k-NN algorithm is used for regression, the output is the property value for the object, where the value is the average of the values of its k nearest neighbors.

Likewise, those of skill in the art will be aware that the k-NN algorithm is a type of instance-based, or lazy, learning, where the function is only approximated locally and computation is deferred until classification. One known approach for both classification and regression is to assign a weight to the contributions of neighbors, such that the nearest neighbors contribute more to the average than more distant ones. For example, one such a common weighting scheme is give each neighbor a weight of 1/d, where d is the distance to the neighbor. In such an approach, the neighbors are taken from a set of objects for which the class resulting from the performance of a k-NN classification, or the property value resulting from the performance of a k-NN regression, is known. The resulting set of neighbors can then be used as the training set for the k-NN algorithm.

In certain embodiments, various k-means clustering and k-nearest classifier approaches, individually or in combination, may be implemented to classify entity-specific security policies into clusters whose associated entities have similar user behavior characteristics. In certain embodiments, such k-means clustering and k-nearest classifier approaches may use a combination of event data, entity identifier information, and user behavior data, described in greater detail herein, to perform associated classification and clustering operations. In certain embodiments, the event data, entity identifier information, and user behavior data may be stored in a user behavior profile, likewise described in greater detail herein.

In this embodiment, k-means clustering is depicted in the context of a Cartesian graph 1000, where the x axis represents roles 1002 of various entities in an organization and they axis represents their respective titles 1004. As shown in FIG. 10, the roles 1002 delineated on the x axis include design 1006, engineering 1008, production 1010, marketing 1012, and sales 1014. Likewise, the titles 1004 delineated on they axis include maintenance, 1016, operations 1018, staff 1020, middle managers 1022 and senior executives 1024.

As likewise shown in FIG. 10, the plotting of various clusters of entity-specific security policies corresponding to entities within the organization is depicted according to their respective roles 1002 and titles 1004. For example, clusters 1030, 1032, 1034, 1036 and 1038 respectively represent clusters of entity-specific security policies whose associated entities have the role 1002 of staff 1020 for design 1006, engineering 1008, production 1010, marketing 1012, and sales 1014. Likewise, clusters 1040, 1042 and 1044 respectively represent clusters of entity-specific security policies whose associated entities have the role 1002 of operations 1018 for design 1006, engineering 1008, and production 1010.

In various embodiments, the concentration of entity-specific security policies in certain clusters may be dense, such as clusters 1034, 1038, 1044 and 1046, while others, such as clusters 1048 and 1050 may be sparse. For example, clusters 1044 and 1046 respectively represent clusters of entity-specific security policies associated with entities having the role 1002 of operations 1018 and maintenance 1016 for production 1010. In contrast, clusters 1048 and 1050 respectively represent clusters of entity-specific security policies associated with entities having the role 1002 of operations 1018 for marketing 1012 and sales 1014.

Certain embodiments of the invention reflect an appreciation that user profiles associated with various entities, regardless of whether their respectively associated clusters of entity-specific security policies are dense or sparse, may or may not share certain similarities. By extension, it is likely the rules and actions of their associated entity-specific security policies may or may not share certain similarities. Accordingly, while the density of entity-specific security policies associated with a particular cluster may increase the likelihood of shared similarities, it is no guarantee.

In various embodiments, the concentration of entity-specific security policies in certain clusters may be sparse, and be distant from one another, yet share certain similarities. For example, small clusters of entity-specific security policies may be associated with entities having the role 1002 of middle managers 1022 for design 1006, engineering 1008, production 1010, marketing 1012, and sales 1014. In this example, the individual entity-specific security policies within each of the clusters may respectively be associated with entities whose associated profiles may share some similarities, yet not others. By extension, it is likely the rules and actions of their associated entity-specific security policies may likewise share certain similarities, yet not others. Accordingly, due to those shared similarities, their associated entity-specific security policies may be aggregated in certain embodiments into a group of clusters 1028.

In certain embodiments, individual entity-specific security policies may be distant from one another, yet may be correlated to one another through a virtual cluster 1026. As an example, an executive management 1024 team may include various entities such as a Chief Executive Officer and Vice Presidents of design 1006, engineering 1008, production 1010, marketing 1012, and sales 1014. In this example, the user profiles corresponding to these individual entities may share various similarities, despite not being associated with other entities within a cluster. By extension, it is likely the rules and actions of their associated entity-specific security policies may likewise share certain similarities. Accordingly, due to those shared similarities, their associated entity-specific security policies may be aggregated in certain embodiments into a virtual cluster 1026.

In certain embodiments, clusters of entity-specific security policies may be implemented to adaptively evolve a target entity-specific security policy associated with a particular entity according to the enactment of certain electronically-observed user behavior corresponding to an event. In certain embodiments, the evolving of a first entity-specific security policy may include revising its associated rules and actions to match, in whole or in part, the rules and actions associated with a second entity-specific security policy. In certain of these embodiments, the first entity-specific security policy may be associated with a first entity whose corresponding user identity data and user behavior attributes match, to one degree or another, that of a second entity associated with the second entity-specific security policy.

As an example, an organization may hire a new member 1052 of marketing 1012 staff 1020. In this example, the new member 1052 may initially be assigned an entity-specific security policy whose rules define certain sources of content that cannot be accessed without approval. To continue the example, the new member's 1052 entity-specific security policy may only allow access to sources of content that are directly relevant to their role 1002 in marketing 1012. Otherwise, access is denied until the policy is revised.

In further continuance of the example, the member 1052 of marketing 1012 staff 1020 may attempt to access certain sources of sales 1014 content that are relevant to preparing for a field marketing event. As a result, their attempt to access such resources is temporarily blocked until a member 1054 of sales 1014 staff 1020 is identified who has an associated user profile that is the closest match to the user profile associated with the member 1052 of marketing 1012 staff 1020. For the purpose of illustrating this example, the member 1054 of sales 1014 staff 1020 may be responsible for serving as a liaison to marketing 1012, and as such, may further be responsible for facilitating the sharing of information between sales 1014 and marketing 1012.

Once the entity-specific security policy associated with the member 1054 of sales 1014 staff 1020 is identified, it is processed to see if it contains a rule allowing access to the source of sales 1014 content. If so, the same rule is then used to revise the entity-specific security policy associated with the member 1052 of marketing 1012 staff 1020 and access to the source of sales 1014 content is allowed. However, the entity-specific security policy associated with the member 1054 of sales 1014 staff 1020 may contain a rule blocking access to the source of sales 1014 content. If so, then the same rule is then used to revise the entity-specific security policy associated with the member 1052 of marketing 1012 staff 1020 and access to the source of sales 1014 content is blocked.

To further continue the prior example, the member 1052 of marketing 1012 staff 1020 may attempt to access certain sources of production 1010 content, such as product shipment dates that are likewise relevant to prepare for the field marketing event. As a result, their attempt to access such resources is temporarily blocked until a member 1056 of production 1010 staff 1020 is identified who has an associated user profile that is the closest match to the user profile associated with the member 1052 of marketing 1012 staff 1020. As before, the member 1056 of production 1010 staff 1020 may be responsible for serving as a liaison to marketing 1012, and as such, may further be responsible for facilitating the sharing of information between production 1010 and marketing 1012.

Accordingly, once the entity-specific security policy associated with the member 1056 of production 1010 staff 1020 is identified, it is processed to see if it contains a rule allowing access to the source of production 1010 content. If so, the same rule is then used to revise the entity-specific security policy associated with the member 1052 of marketing 1012 staff 1020 and access to the source of production 1010 content is allowed. However, as likewise before, if the entity-specific security policy associated with the member 1056 of production 1010 staff 1020 may contain a rule blocking access to the source of production 1010 content. If so, then the same rule is then used to revise the entity-specific security policy associated with the member 1052 of marketing 1012 staff 1020 and access to the source of production 1010 content is blocked.

In certain embodiments, neighboring clusters of entity-specific security policies may be implemented to be used in combination with a target entity-specific security policy to adaptively respond to electronically-observed user behavior of an associated entity. In certain embodiments, the adaptive response may include revising the rules and actions associated with a first entity-specific security policy to match, in whole or in part, the rules and actions associated with a second entity-specific security policy. In certain of these embodiments, the first entity-specific security policy may be associated with a first entity whose corresponding user identity data and user behavior attributes match, to one degree or another, that of a second entity associated with the second entity-specific security policy.

To continue the prior example, the member 1052 of marketing 1012 staff 1020 may attempt to access a source of engineering 1008 content to gain advance knowledge of planned features for a particular product. As a result, their attempt to access such resources is temporarily blocked until a member 1058 of engineering 1008 staff 1020 is identified who has an associated user profile that is the closest match to the user profile associated with the member 1052 of marketing 1012 staff 1020. However, unlike before, the member 1058 of engineering 1008 staff 1020 is not responsible for serving as a liaison to marketing 1012.

Instead, their primary responsibility is for planning product feature release dates for incorporation into production 1010 of various products. As a result, once the entity-specific security policy associated with the member 1056 of engineering 1008 staff 1020 is identified, it may be discovered that it contains a rule forbidding anyone who is not directly associated with engineering 1008 to access the source of engineering 1008 content. If so, then the same rule is then used to revise the entity-specific security policy associated with the member 1052 of marketing 1012 staff 1020 and access to the source of engineering 1008 content is blocked.

In certain embodiments, an entity-specific security policy may be implemented to inheriting certain rules and actions from a closest-matching entity-specific security policy on an event basis. In certain embodiments, the inheritance is performed according to the event matching past events enacted by the entity associated with the closest-matching policy. As an example, member 1054 of sales 1014 staff 1020 may attempt to access certain sales forecast summary reports generated by a member 1060 of sales 1050 operations 1018. In this example, the entity-specific security policy associated with the member 1060 of sales 1050 operations 1018 may contain a rule stating that individual members of sales 1014 staff 1020 may each access their own sales forecast information, but not that of others, or for various groups within sales 1014.

Likewise, the same rule may state that the member 1060 of sales 1050 operations 1018 may access any such information. As a result, portions of the rule may be inherited by the entity-specific security policy associated with the member 1054 of sales 1014 staff 1020 when they attempt to access sales forecast summary reports in general, rather than just for themselves. Consequently, the entity-specific security policy of the member 1054 of sales 1014 staff 1020 is revised to reflect they are only able to access their own sales forecast information, but not that of others. In this example, the attempt to access sales forecast summary reports in general is the event, which may be enacted by the member 1054 of sales 1014 staff 1020 or by the member 1060 of sales 1014 operations 1018. However, the results may be different due to the inheritance of certain rules and actions from one entity-specific security policy by another in relation to the enactment of a particular event.

In certain embodiments, the decision to incorporate a rule and associated action from a first entity-specific security policy into a second entity-specific security policy may be based upon the degree to which the two entity-specific security policies match one another. To continue the preceding example, the entity-specific security policy associated with the member 1052 of marketing 1012 staff 1020 may only have a ten percent match to the entity-specific security policy associated with the member 1056 of production 1010 staff 1020. Accordingly, even though the entity-specific security policy associated with the member 1056 of production 1010 staff 1020 may include a rule allowing access to the source of production 1010 content, a determination may be made not to incorporate it into the entity-specific security policy associated with the member 1052 of marketing 1012 staff 1020. Consequently, access to the source of production 1010 content by the member 1052 of marketing 1012 staff 1020 may be blocked. In various embodiments, the degree to which a first entity-specific security policy needs to match a second entity-specific security policy to incorporate an associated rule and action, and the circumstances by which such an incorporation occurs, is a matter of design choice.

In certain embodiments, the decision to incorporate a rule and associated action from a first entity-specific security policy into a second entity-specific security policy may be based upon the distance between the two clusters the two entity-specific security policies are respectively associated with. In yet further continuance of the preceding example, the closest-matching entity-specific security policy for the member 1052 of marketing 1012 staff 1020 containing a rule allowing access to a source of engineering 1008 content may be associated with the member 1058 of engineering 1008 staff 1020. However, as shown in FIG. 10, the distance between the two entity-specific security policies associated clusters may be distant. Accordingly, even though the entity-specific security policy associated with the member 1058 of engineering 1008 staff 1020 may allow access to the source of engineering 1008 content, it may not be incorporated into the entity-specific security policy associated with the member 1052 of marketing 1012 staff 1020. Consequently, the member 1052 of marketing 1012 staff 1020 may be blocked from accessing the source of engineering 1008 content.

In certain embodiments, a weighting factor corresponding to the distance between two clusters of entity-specific security policies may be implemented to determine whether a rule and action from a first entity-specific security policy is incorporated into a second. To continue the preceding yet further, the entity-specific security policy associated with the member 1058 of engineering 1008 staff 1020 may allow access to the source of engineering 1008 content. However, the distance d of its associated cluster is a value of '2' from the cluster associated with the entity-specific security policy that is likewise associated with the member 1052 of marketing 1012 staff 1020. Accordingly, its weighting factor may be determined to be 1/d, resulting in a weighting factor value of '0.5'.

Conversely, the entity-specific security policy associated with the member 1056 of production 1010 staff 1020 may likewise allow access to the source of engineering 1008 content. However, the distance d of its associated cluster is a value of '1' from the cluster associated with the entity-specific security policy that is likewise associated with the member 1052 of marketing 1012 staff 1020. Accordingly, its weighting factor may be determined to be 1/d, resulting in a weighting factor value of '1.0'. Accordingly, the rule and action allowing access to the source of engineering 1008 content contained in the entity-specific security policy associated with the member 1056 of production 1010 staff 1020 may be incorporated into the entity-specific security policy associated with the member 1052 of marketing 1012 staff 1020 as it has a higher weighting factor value.

In certain embodiments, the determination of the minimum weighting factor value for allowing incorporation of a rule and action from one entity-specific security policy to another is a matter of design choice. In certain embodiments, the determination of under what circumstances such incorporation may be performed is likewise a matter of design choice. Those of skill in the art will recognize that many such embodiments and examples are possible. Accordingly, the foregoing is not intended to limit the spirit, scope or intent of the invention.

Figure 11A:
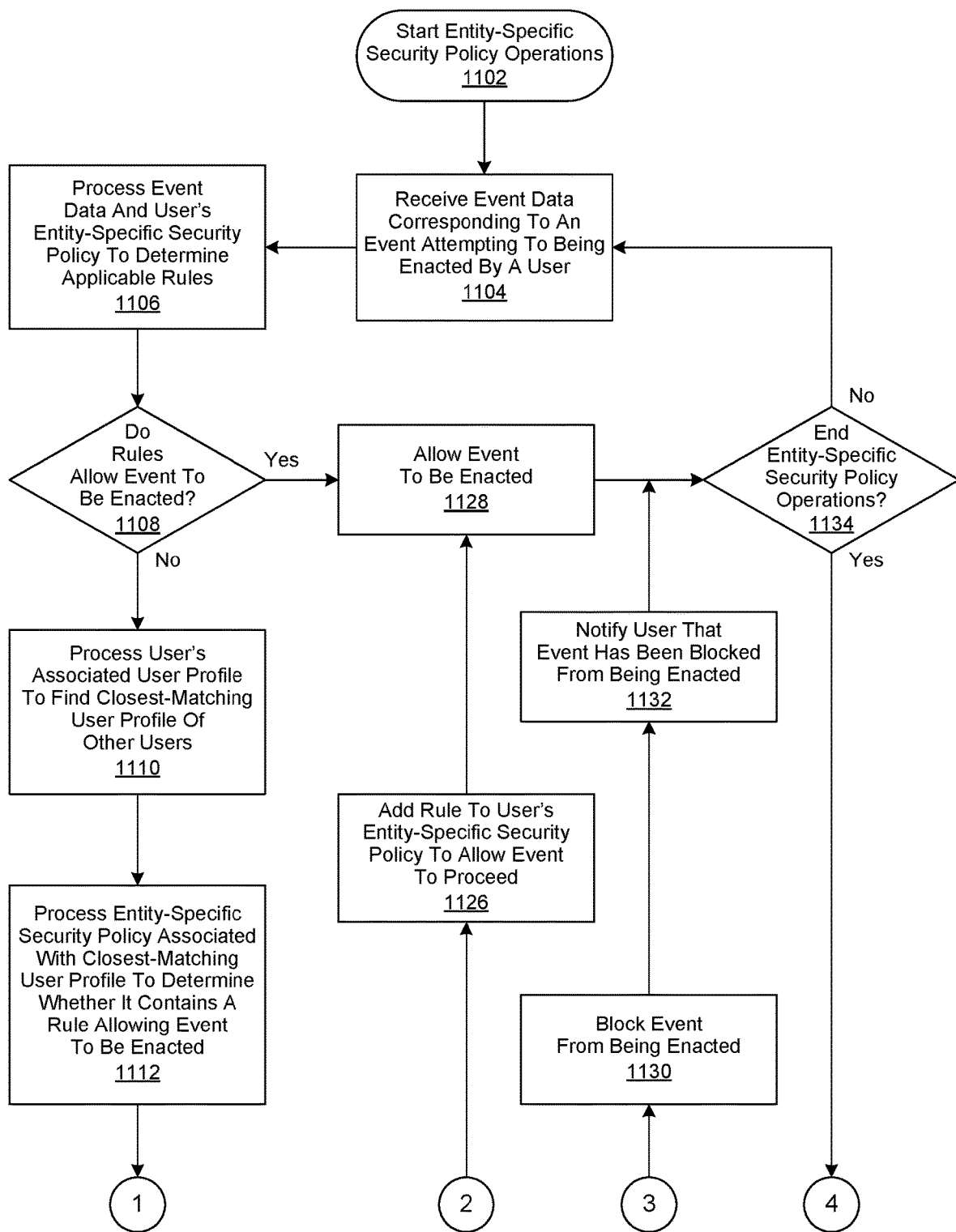
FIGS. 11a and 11b are a generalized flowchart of the performance of entity-specific security policy operations.
Figure 11B:
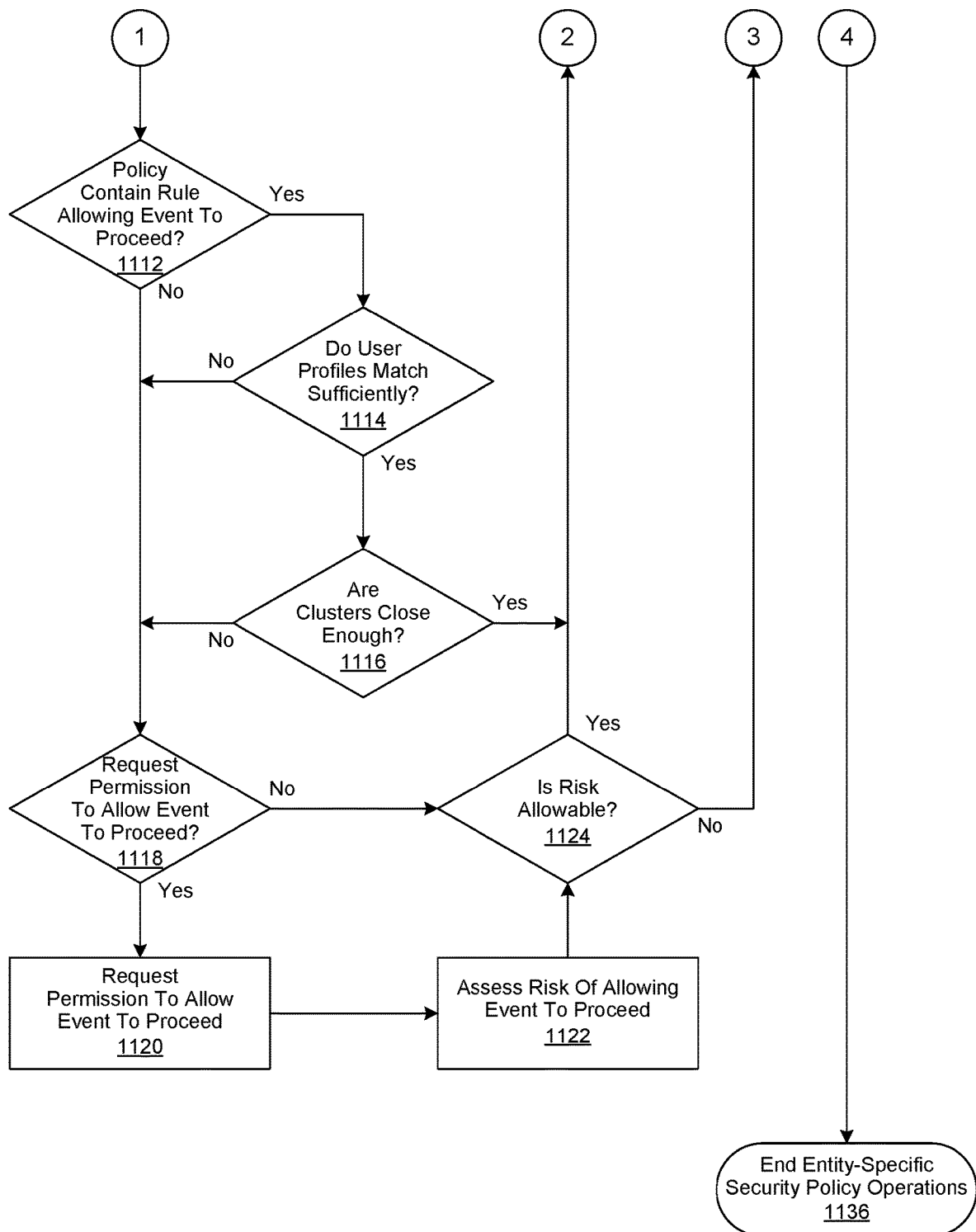

FIGS. 11a and 11b are a generalized flowchart of the performance of entity-specific security policy operations implemented in an embodiment of the invention. In this embodiment, entity-specific security policy operations are begun in step 1104, followed by the receipt of event data in step 1106 corresponding to an event, described in greater detail herein, a user is in the process of enacting. The event data received in step 1104 is then processed with the user's associated entity-specific security policy in step 1106 to determine whether the policy contains one or more rules corresponding to the event the user is in the process of enacting.

A determination is then made in step 1108 whether the user's entity-specific security policy contains one or more rules allowing the enactment of the event. If so, then the event is allowed to be enacted in step 1128, followed by a determination being made in step 1134 whether to end entity-specific security operations. If not, then the process is continued, proceeding with step 1104. Otherwise, entity-specific security policy operations are ended in step 1136.

Certain embodiments of the invention reflect an appreciation that a user's entity-specific security policy may contain one or more rules preventing the enactment of the event from proceeding. However, certain embodiments of the invention likewise reflect an appreciation that enforcement of such rules may result in a false positive. As an example, the user may have changed roles since the rule was incorporated into their entity-specific security policy, and as a result, an event that may not have been allowable before, is now permissible.

Accordingly, if it was determined in step 1108 that the user's associated entity-specific security policy does not contain one or more rules allowing enactment of the event to proceed, then the user's associated user profile is processed in step 1110 to find the closest matching user profile associated with another user. The entity-specific security policy associated with the user having the closest-matching user profile is then processed in step 1112 to determine if it contains one or more rules allowing the event to be enacted. A determination is then made in step 1112 if the entity-specific security policy contains such a rule.

If so, then a determination is made in step 1114 whether the two user profiles are sufficiently matched, as described in greater detail herein. If so, then a determination is then made in step 1116 if the clusters associated with the two entity-specific security policies corresponding to the two users are sufficiently close enough, likewise as described in greater detail herein. If not, or if it was determined in step 1114 that the two user profiles do not match sufficiently, or in step 1112 that the user's entity-specific security policy does not contain a rule allowing the enactment of the event to proceed, then a determination is made in step 1118 whether to request permission for the event to be enacted.

If so, then a request is submitted in step 1120 to allow enactment of the event to proceed, followed by the performance of an assessment of the risk associated with allowing the event to be enacted in step 122. Thereafter, or if it was determined in step 1118 to not request permission to allow enactment of the event to proceed, then a determination is made in step 1124 whether the assessed risk is allowable. If so, or if it was determined in step 1116 that the clusters associated with the two entity-specific security policies corresponding to the two users are sufficiently close enough, then a rule allowing enactment of the event to proceed is added to the user's entity-specific security policy in step 1126.

Thereafter, or if it was determined in step 1108 that the user's entity-specific security policy allows the event to be enacted, then the event is enacted in step 1128. However, if it was determined in step 1124 that the risk assessment performed in step 1122 indicates that the risk associated with the enactment of the event would not be allowable, then the event is blocked from being enacted in step 1130 and the user is notified accordingly in step 1132. Thereafter, or after the event is allowed to be enacted in step 1128, the process is continued, proceeding with step 1134.

Figure 12:
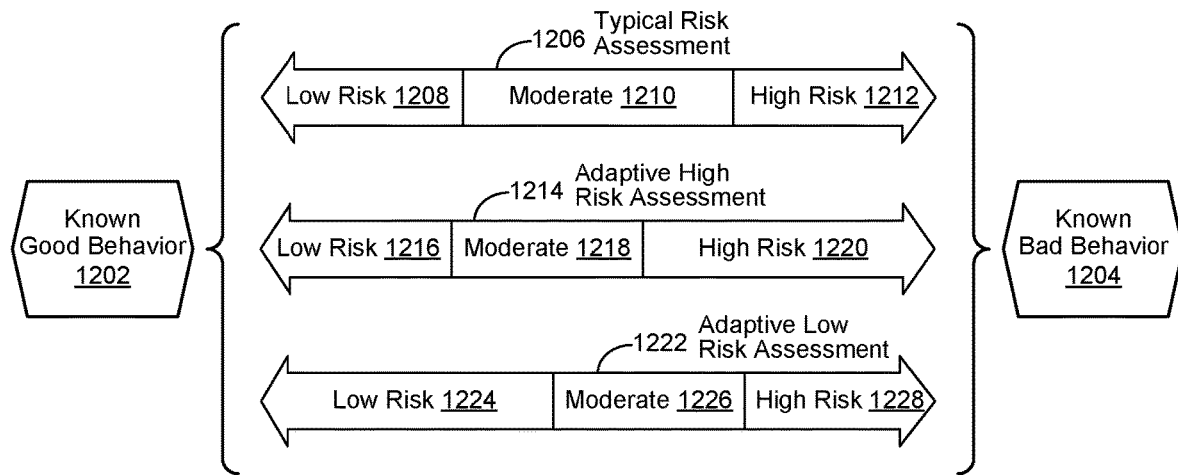
FIG. 12 is a simplified block diagram of a security analytics system implemented to adaptively assess risk associated with a user behavior.

FIG. 12 is a simplified block diagram of the operation of a security analytics system implemented in accordance with an embodiment of the invention to adaptively assess risk associated with a user behavior. In this embodiment, the user behavior is monitored and compared to known good behavior 1202 and known bad behavior 1204. In typical risk assessment 1206 approaches, low 1208, moderate 1210, or high 1212 risk user behavior is generally determined by using fairly inflexible security policies, which are typically used to enact relatively static responses.

As an example, a security policy implemented for access control may have a list of actions a particular user can do and a list of things they cannot. Ordinarily, the actions in those lists are static and don't change, regardless of the particular user behavior being enacted by the user. However, perhaps they should change, or adapt, if it is determined the user behavior being enacted by the user has changed, and as a result, represents a higher risk To continue the example, a user may be perusing various resources and happens to access a webpage, such as a shopping site, that contains certain objects. Typical security approaches assume some portion of those objects to be good, a small number are known to be bad, and the remainder suspicious. Consequently, there is a continuum of objects, some assumed to be good, some undetermined, and the rest known to be bad. It will be appreciated that the determination of what is considered to be good, undetermined or bad is oftentimes fairly arbitrary.

In certain embodiments, contextual information associated with the user behavior being enacted by the user is collected and processed to adaptively respond to changes in the user's current user behavior. In continuance of the example, the user may change their user behavior to access internal business resources. In this example, accessing internal business resources is contextual information that may represent the potential for higher risk. As a result, a risk-adaptive behavior system may be implemented in certain embodiments to respond with an adaptive high risk assessment 1214. In certain embodiments, the adaptive high risk assessment 1214 is generated by a security analytics system, described in greater detail herein. Consequently, the adaptive high risk assessment 1214 may indicate a larger percentage of certain user behavior as high 1220 risk, and a smaller percentage as low 1216 or moderate 1218 risk.

In further continuance of the example, the user may further change their user behavior to access an external new site. As before, the user's access of an external news site is contextual information that may represent the likelihood of lower risk. As a result, the risk-adaptive behavior system may be implemented to respond with an adaptive low risk assessment 1222, which may indicate a larger percentage of certain user behavior as low 1224 risk, and a smaller percentage as moderate 1226 or high 1228 risk.

Certain embodiments of the invention reflect an appreciation that without the described adaptive behavior, the operational overhead administering user security would be high, as all user interactions related to their user behavior would continue to be monitored. However, the cost of administering user security would decrease when the user was no longer interacting with internal resources. Consequently, risk tolerance can be dynamically adjusted according to the context of a given user activity.

More particularly, if the user's activity is primarily internal to the organization, then some risk can be tolerated. However, if the user's activity is primarily external to the organization, then it is possible that essentially all risk can be tolerated. Furthermore, the user experience may be more pleasant during non-organization activities, as fewer security controls may be applied or experienced. Moreover, the risk assessment becomes dynamic, according to the identity of the user, the resources being accessed, their respective user behavior, and corresponding points of observation.

Figure 13:
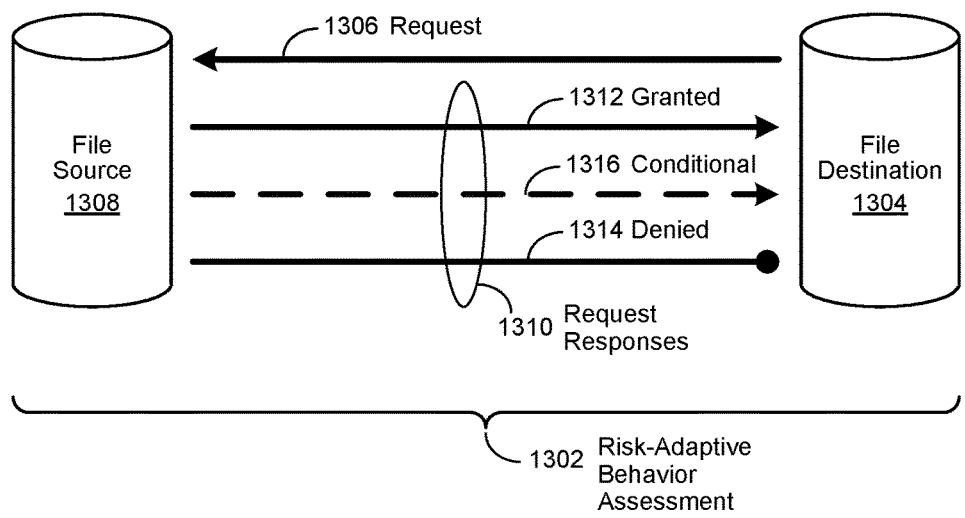
FIG. 13 is a simplified block diagram of the operation of a security analytics system to adaptively respond to a user request.

FIG. 13 is a simplified block diagram of the operation of a security analytics system implemented in accordance with an embodiment of the invention to adaptively respond to a user request. In this embodiment, a user may place a request 1306 to download a file from a file source 1308 to a file destination 1304, such as a USB drive. In traditional security approaches, the owner of the requested file may have a single security rule, which would be a granted 1312, or denied 1314, request response 1310 as to whether the user was allowed to download the file.

In certain embodiments, a risk-adaptive security policy, as described in greater detail herein, may be implemented such that the user's request 1306 to download the requested file is typically granted 1312. However, the user may have recently updated their online resume as well as begun to take random days off, which may imply a flight risk. By extension, the user behavior and other actions associated with the user may likewise imply the user's intent to take proprietary information with them to a new job. Consequently, various risk-adaptive behavior approaches, described in greater detail herein, may yield a denied 1314 request response 1310 due to the associated context of their user behavior, other actions, or a combination thereof.

Alternatively, a risk-adaptive security policy may be implemented in various embodiments to provide a conditional 1316 request response 1310. As an example, the requested file may be encrypted such that it can only be opened on a corporate computer. Furthermore, attempting to open the file on a non-corporate computer may result in a message being sent to a security administrator. Likewise, a single file being downloaded may appear as good behavior, yet multiple sequential downloads may appear suspicious, especially if the files do not appear to be related, or possibly, if they do. From the foregoing, it will be appreciated that risk-adaptive behavior is not necessarily based upon an atomic action, but rather a multiplicity of factors, such as contextual information associated with particular user behavior.

Figure 14:
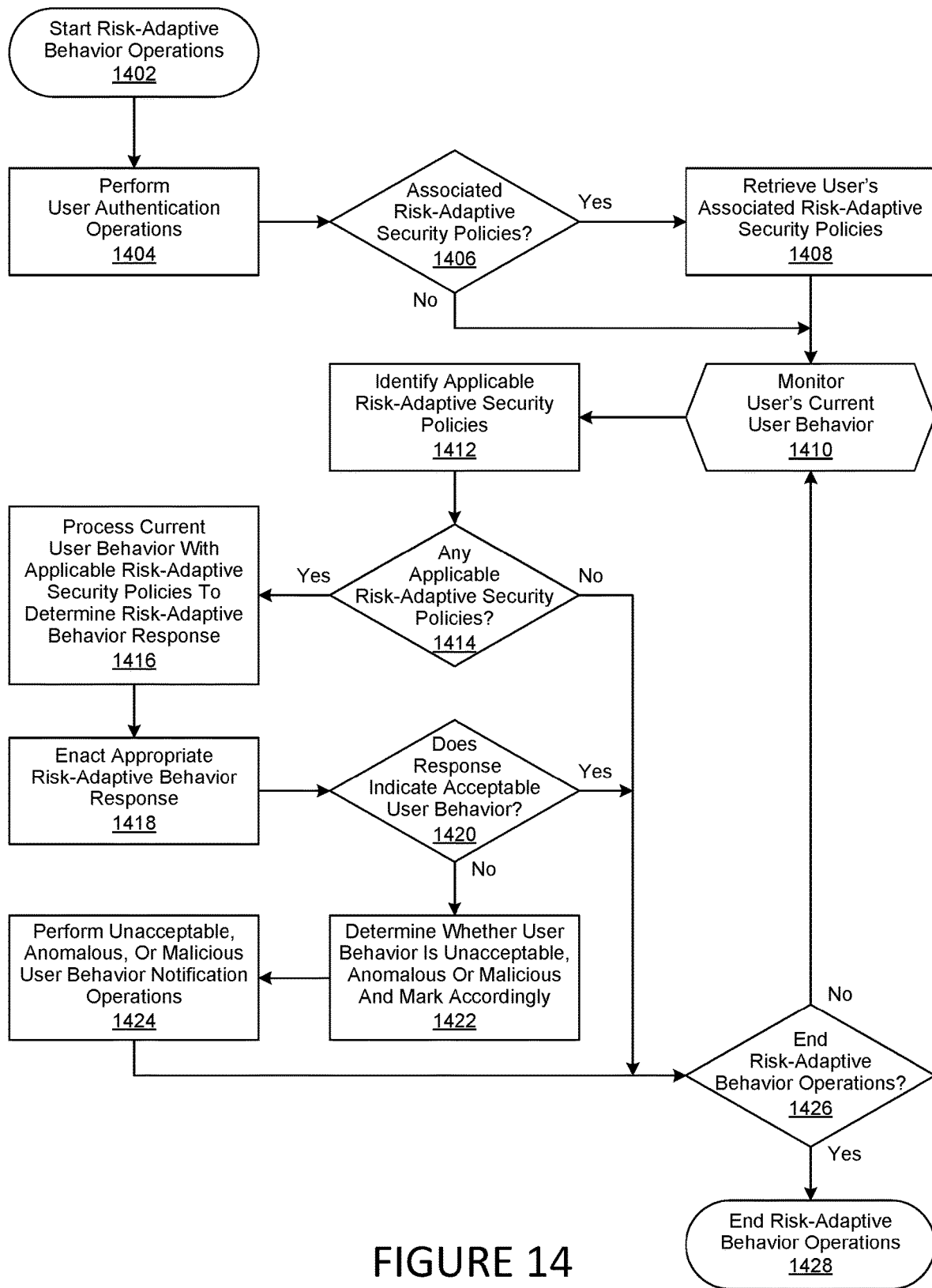
FIG. 14 is a generalized flowchart of the performance of security analytics system operations for adaptively managing user behavior risk.

FIG. 14 is a generalized flowchart of the performance of security analytics system operations implemented in accordance with an embodiment of the invention to adaptively manage user behavior risk. In this embodiment, risk-adaptive behavior operations are begun in step 1402, followed by the performance of user authentication operations, familiar to those of skill in the art, in step 1404. A determination is then made in step 1406 whether the user has one or more associated risk-adaptive security policies. If so, then they are retrieved for use in step 1408. Thereafter, or if it was determined in step 1406 the user has no associated risk-adaptive security policies, the user's user behavior is monitored in step 1410.

The user's current user behavior is then processed in step 1412 to identify any applicable risk-adaptive security policies that may apply. A determination is then made in step 1414 whether any applicable risk-adaptive security policies have been identified. If not, a determination is made in step 1426 whether to end risk-adaptive behavior system operations. If not, then the process is continued, proceeding with step 1410. Otherwise, risk-adaptive behavior system operations are ended in step 1428.

However, if it is determined in step 1414 that one or more applicable risk-adaptive security policies have been identified, then they are used in step 1416 to process the user's current user behavior to determine an appropriate risk-adaptive behavior response. The appropriate risk-adaptive behavior response is then enacted in step 1418, followed by a determination being made in step 1420 whether the risk-adaptive behavior response enacted in step 1418 indicates acceptable user behavior.

If so, then the process is continued, proceeding with step 1426. Otherwise the user's current user behavior is determined to be unacceptable, anomalous, or malicious and marked accordingly in step 1422. Unacceptable, anomalous, or malicious user behavior notification operations are then performed in step 1424. In one embodiment, the unacceptable, anomalous, or malicious user behavior is stored for later review. In another embodiment, a security administrator is notified of the unacceptable, anomalous, or malicious user behavior. Thereafter, the process is continued, proceeding with step 1426.

Figure 15:
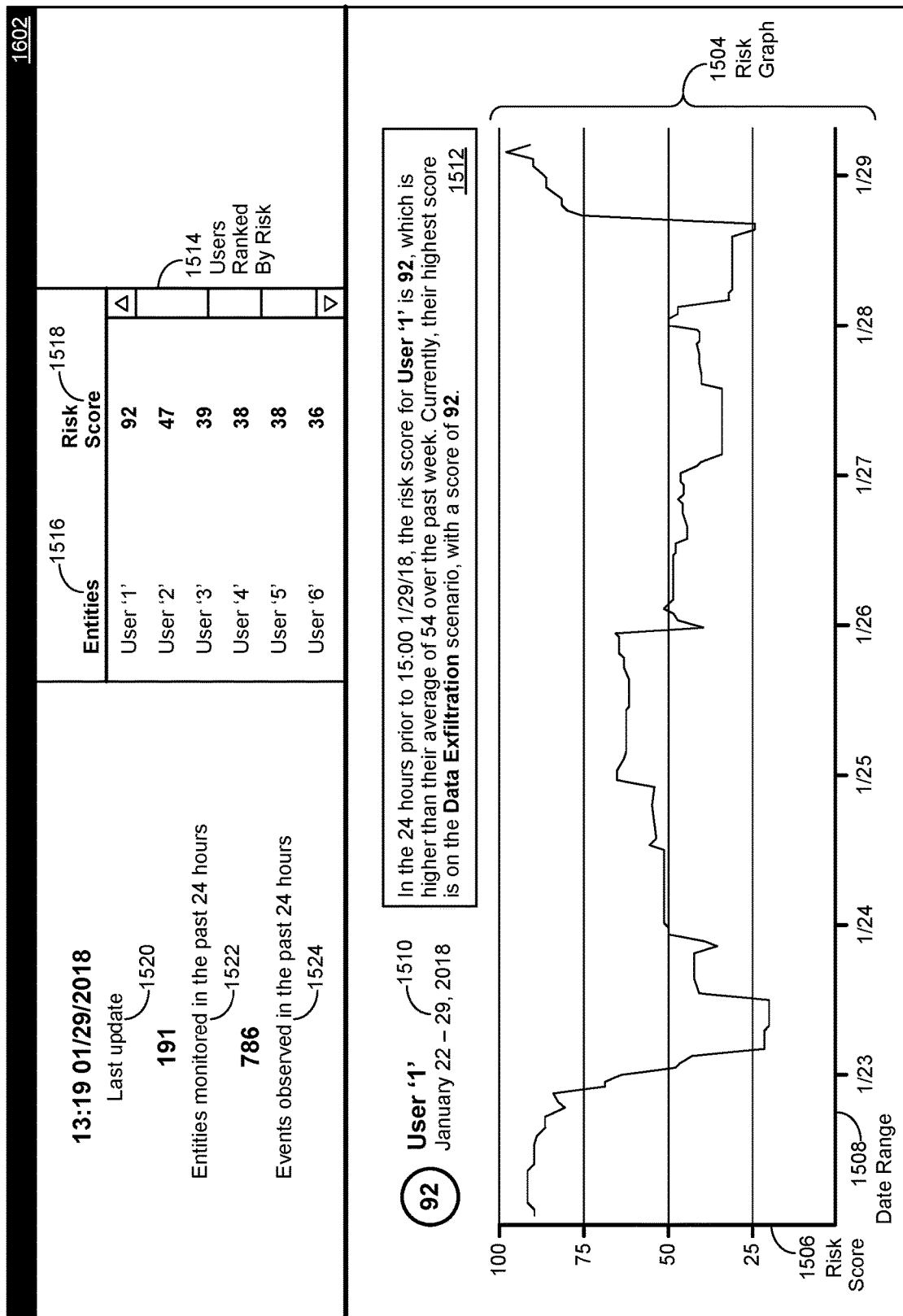
FIG. 15 shows the operation of a security analytics system within a user interface implemented in accordance with an embodiment of the invention.

FIG. 15 shows the operation of a security analytics system within a user interface implemented in accordance with an embodiment of the invention. In this embodiment, a risk graph 1504 displayed within a user interface (UI) window 1502 depicts the fluctuation of risk scores 1506 at different points in time within a particular date range 1508. In certain embodiments, the fluctuation of risk scores 1506 displayed within the risk graph 1504 corresponds to the potential risk associated with a particular user 1510 at various points in time within the date range 1508. In certain embodiments, a risk details window 1512 corresponding to the user 1510 may be displayed within the UI window 1502.

In certain embodiments, summary information may likewise be displayed within the UI window 1502. For example, as shown in FIG. 15, the last update 1520 of the risk graph 1504, the number of entities 1522 monitored in the last 24 hours, and the number of events 1524 observed in the last 24 hours may be displayed. In certain embodiments, individual entities 1516 being monitored, and their associated risk scores 1518, may be displayed in ranked order 1514 by their corresponding risk scores within the UI window 1502.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for enforcing security policies, comprising:
monitoring electronically-observable user interactions of an entity, the electronically-observable user interactions comprising corresponding user behavior of the entity, the monitoring being performed by a protected endpoint, the protected endpoint comprising an endpoint agent executing on an endpoint device, the endpoint agent comprising an entity-specific security policy feature pack;
converting the electronically-observable user interactions into electronic information representing the user behavior; and,
applying an organization specific security policy based upon the electronic information representing the user behavior, the organization specific security policy comprising an automatically generated organization specific rule, the organization specific security policy comprising an aggregation of a plurality of entity specific security policies, each of the plurality of entity specific security policies corresponding to a respective entity, each respective entity having a corresponding user profile, each corresponding user profile comprising a collection of information that uniquely describes an identify of the respective entity, the collection of information comprising a user profile attribute, a user behavior factor and a user mindset factor, the mindset factor comprising information used to determine a mental state of a user at a particular point in time, the organization specific security policy comprises a risk-adaptive security policy, the risk-adaptive security policy comprising a security policy implemented to be revised to adaptively remediate risk associated with a user behavior, the user behavior being represented via a plurality of risk-adaptive behavior factors, the plurality of risk-adaptive behavior factors comprising at least one user behavior factor and a user mindset factor; and,
using the organization specific security policy to perform a security analytics operation, the security analytics operation identifying anomalous, abnormal, unexpected, or malicious user behavior, the security analytics operation being performed by a security analytics system, the security analytics system communicating with the protected endpoint via a network.

2. The method of claim 1, further comprising:
evolving a security policy according to the electronically observable user interactions associated with the event, the evolving the organization specific security policy comprising revising rules associated with the organization specific security policy according to enactment of a user behavior corresponding to an event.

3. The method of claim 1, wherein:
each of the plurality of entity-specific security policies comprise an automatically generated entity-specific rule.

4. The method of claim 1, further comprising:
detecting occurrence of an event;
associating the event with an entity; and,
applying the organization specific security policy to the entity based upon the event.

5. The method of claim 1, wherein:
the automatically generated rule comprises a rule associated with an event, the rule associated with the event comprising an indication of whether to allow a particular entity to perform the event; and further comprising
associating the organization specific security policy with the particular entity; and,
applying the organization security policy to the entity.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
monitoring electronically-observable user interactions of an entity, the electronically-observable user interactions comprising corresponding user behavior of the entity, the monitoring being performed by a protected endpoint, the protected endpoint comprising an endpoint agent executing on an endpoint device, the endpoint agent comprising an entity-specific security policy feature pack;

converting the electronically-observable user interactions into electronic information representing the user behavior; and, applying an organization specific security policy based upon the electronic information representing the user behavior, the organization specific security policy comprising an automatically generated organization specific rule, the organization specific security policy comprising an aggregation of a plurality of entity specific security policies, each of the plurality of entity specific security policies corresponding to a respective entity, each respective entity having a corresponding user profile, each corresponding user profile comprising a collection of information that uniquely describes an identify of the respective entity, the collection of information comprising a user profile attribute, a user behavior factor and a user mindset factor, the mindset factor comprising information used to determine a mental state of a user at a particular point in time, the organization specific security policy comprises a risk-adaptive security policy, the risk-adaptive security policy comprising a security policy implemented to be revised to adaptively remediate risk associated with a user behavior, the user behavior being represented via a plurality of risk-adaptive behavior factors, the plurality of risk-adaptive behavior factors comprising at least one user behavior factor and a user mindset factor; and, using the organization specific security policy to perform a security analytics operation, the security analytics operation identifying anomalous, abnormal, unexpected, or malicious user behavior, the security analytics operation being performed by a security analytics system, the security analytics system communicating with the protected endpoint via a network.

7. The system of claim 6, wherein the instructions executable by the processor are further configured for:

evolving a security policy according to the electronically observable user interactions associated with the event, the evolving the organization specific security policy comprising revising rules associated with the organization specific security policy according to enactment of a user behavior corresponding to an event.

8. The system of claim 6, wherein:

each of the plurality of entity-specific security policies comprise an automatically generated entity-specific rule.

9. The system of claim 6, wherein the instructions executable by the processor are further configured for:

detecting occurrence of an event;
associating the event with an entity; and,
applying the organization specific security policy to the entity based upon the event.

10. The system of claim 6, wherein:

the automatically generated rule comprises a rule associated with an event, the rule associated with the event comprising an indication of whether to allow a particular entity to perform the event; and further comprising associating the organization specific security policy with the particular entity; and, applying the organization security policy to the entity.

11. A non-transitory, computer-readable storage medium embodying computer program code, the computer program code comprising computer executable instructions configured for:

monitoring electronically-observable user interactions of an entity, the electronically-observable user interactions comprising corresponding user behavior of the entity, the monitoring being performed by a protected endpoint, the protected endpoint comprising an endpoint agent executing on an endpoint device, the endpoint agent comprising an entity-specific security policy feature pack;

converting the electronically-observable user interactions into electronic information representing the user behavior; and, applying an organization specific security policy based upon the electronic information representing the user behavior, the organization specific security policy comprising an automatically generated organization specific rule, the organization specific security policy comprising an aggregation of a plurality of entity specific security policies, each of the plurality of entity specific security policies corresponding to a respective entity, each respective entity having a corresponding user profile, each corresponding user profile comprising a collection of information that uniquely describes an identify of the respective entity, the collection of information comprising a user profile attribute, a user behavior factor and a user mindset factor, the mindset factor comprising information used to determine a mental state of a user at a particular point in time, the organization specific security policy comprises a risk-adaptive security policy, the risk-adaptive security policy comprising a security policy implemented to be revised to adaptively remediate risk associated with a user behavior, the user behavior being represented via a plurality of risk-adaptive behavior factors, the plurality of risk-adaptive behavior factors comprising at least one user behavior factor and a user mindset factor; and, using the organization specific security policy to perform a security analytics operation, the security analytics operation identifying anomalous, abnormal, unexpected, or malicious user behavior, the security analytics operation being performed by a security analytics system, the security analytics system communicating with the protected endpoint via a network.

12. The non-transitory, computer-readable storage medium of claim 11, wherein the computer executable instructions are further configured for:

evolving a security policy according to the electronically observable user interactions associated with the event, the evolving the organization specific security policy comprising revising rules associated with the organization specific security policy according to enactment of a user behavior corresponding to an event.

13. The non-transitory, computer-readable storage medium of claim 11, wherein:

each of the plurality of entity-specific security policies comprise an automatically generated entity-specific rule.

14. The non-transitory, computer-readable storage medium of claim 11, wherein the computer executable instructions are further configured for:

detecting occurrence of an event;
associating the event with an entity; and, applying the organization specific security policy to the entity based upon the event.

15. The non-transitory, computer-readable storage medium of claim 11, wherein:
the automatically generated rule comprises a rule associated with an event, the rule associated with the event comprising an indication of whether to allow a particular entity to perform the event; and further comprising
associating the organization specific security policy with the particular entity; and,
applying the organization security policy to the entity.

16. The non-transitory, computer-readable storage medium of claim 11, wherein:
the computer executable instructions are deployable to a client system from a server system at a remote location.

17. The non-transitory, computer-readable storage medium of claim 11, wherein:
the computer executable instructions are provided by a service provider to a user on an on-demand basis.

* * * * *